United States Patent
Rogers

(10) Patent No.: US 9,082,517 B2
(45) Date of Patent: Jul. 14, 2015

(54) MODULAR APPARATUS FOR CONFINING A PLASMA

(76) Inventor: Joel Guild Rogers, Vancouver (CA)

(*) Notice: Subject to any disclaimer, the term of this patent is extended or adjusted under 35 U.S.C. 154(b) by 493 days.

(21) Appl. No.: 12/141,644

(22) Filed: Jun. 18, 2008

(65) Prior Publication Data

US 2010/0284501 A1 Nov. 11, 2010

(51) Int. Cl.
| G21B 1/03 | (2006.01) |
| G21B 1/05 | (2006.01) |
| G21B 1/19 | (2006.01) |
| G21B 1/17 | (2006.01) |
| H05H 1/02 | (2006.01) |
| H05H 1/12 | (2006.01) |

(52) U.S. Cl.
CPC .. *G21B 1/17* (2013.01); *G21B 1/03* (2013.01); *G21B 1/05* (2013.01); *G21B 1/19* (2013.01); *H05H 1/02* (2013.01); *H05H 1/12* (2013.01); Y02E 30/126 (2013.01)

(58) Field of Classification Search
USPC ......... 376/107, 127, 128, 129, 146, 154, 100, 376/102, 105
See application file for complete search history.

(56) References Cited

U.S. PATENT DOCUMENTS

| 3,664,920 | A * | 5/1972 | Hirsch | 376/107 |
| 4,826,646 | A * | 5/1989 | Bussard | 376/129 |
| 2005/0220243 | A1 | 10/2005 | Greatbatch | |
| 2008/0187086 | A1* | 8/2008 | Bussard et al. | 376/127 |
| 2011/0170647 | A1 | 7/2011 | Bussard | |

OTHER PUBLICATIONS

Morozov et al., "On Galateas-magnetic traps with plasma-embedded conductors", Physics—Uspeklhi, 41 (11), pp. 1049-1056, 1998.*
Dolan "Magnetic Electrostatic Plasma Confinement", Plasma Physics, Controlled Fusion, 36, 1539-1593, 1994.*
Bondarenko, "Role played by O.A.Lavrent'ev in the formulation of problem and initiation of research into controlled nuclear fusion in the USSR", Physics—Uspekhi 44 (88) p. 844 (2001).*
Bussard ,"The advent of clean nuclear fusion: Superperformance space power and propulsion", International Astronautic Congress 2006; Valencia, Spain; 2006—IAC.*
Westner et al., "Ion source with closed drift anode layer plasma acceleration", Review of Scientific Instruments, vol. 73, Issue 2, pp. 729-731 (2002).*
James Riordon, Fusion Power From a Floating Magnet? Science Aug. 6, 1999: vol. 285. No. 5429, pp. 821-823 DOI: 10.1126/science.285.5429.821.*
Rider, T. H., "Fundamental limitations on plasma fusion systems not in thermodynamic equilibrium", Physics of Plasmas 4(4), 1039-1046 (1997).*
Dolan, T.J., "Magnetic electrostatic plasma confinement", Review Article in Plasma Physics and Controlled Fusion 36, pp. 1539-1593 (1994).*

(Continued)

*Primary Examiner* — Johannes P Mondt

(57) ABSTRACT

An embodiment of a hardware module for confining a plasma of electrons and ions in a nuclear fusion energy generating device. In this embodiment, a complete energy generating device is composed of six identical modules, spaced close together in the shape of a cube. The modules confine the plasma inside a cubical enclosure, compress it to high density, and heat it to high temperature. The embodiment of the module is robust and easy to maintain. Other embodiments are described and shown.

6 Claims, 34 Drawing Sheets

(56) References Cited

OTHER PUBLICATIONS

Seife, Ch., "Sun in a Bottle—The Strange History of Fusion and the Science of Wishful Thinking", a Viking Book, published by the Penguin Group (2008), "Appendix:Tabletop Fusion", pp. 229-235.*
McGuire, Thomas J. "Improved Lifetimes and Synchronization Behavior in Multi-grid Inertial Electrostatic Confinement Devices", Ph.D. Thesis, M.I.T., Feb. 2007, (254 pp.) (N.B.: partly made of record by applicant in IDS filed Jul. 8, 2010).*
J.D. Lawson, "Some criteria for a Power Producing Thermonuclear Reactor", Proc. Phys. Soc. B70, pp. 6-10 (1957).*
McCracken et al., "Fusion: The Energy of the Universe": for said review see Plasma Physics and Controlled Fusion 48, pp. 715-716 (2006).*
MIT.; McGuire; "Improved Lifetimes and Synchronization Behavior in Multi-grid IEC Fusion Devices", Ph.D. Thesis; pp. 1-7, 19-25, 98-105, 219-234, 251-254; Feb. 2007; Cambridge, MA.
IAF/IAA; Bussand; "The Advent of Clean Nuclear Fusion: Super-Performance Space Power and Propulsion", 57th International Astronautical Congress(IAC 2006); 15 pgs; Oct. 2008; Valencia, Spain.
EMC2; Bussard&Wray; "EMC2 Inertial-Electrostatic Fusion (IEF) Development: Final Successful Tests of WB-6; Oct./Nov. 2005", EMC2-0806-04 rev.0107; 25 pgs; Aug. 4, 2006; Santa Fe, NM.
Wikipedia, The Free Encyclopedia; Anonymous; "Polywell", http://en.wikipedia.org/wiki/Polywell; 9 pgs.; Sep. 3, 2009; World Wide Web.
EMC2; King&Bussard; "EKXL: A Dynamic Poisson Solver for Polywelltm/HEPS Spherical Converging Flow Systems", EMC2-0791-03; 28 pgs. Jul. 24, 1991; Manassas, VA.
Tech-X Corporation; Cary et al; "OOPIC Pro OOPIC Pro TM User's Guide", v1.2.0; pp. 1-9, 26-52, 71-72; Jan. 2, 2009; Boulder, CO.
Askmar; Duncan; "IEC Fusion", http://www.askmar.com/Fusion.html; 6 pgs.; Nov. 2009; World Wide Web.
University of Wisconsin; Rogers; "PIC Simulation of Polywell", http://fti.neep.wisc.edu/static/TALKS/12Oct1205joelroge.pdf; 21 pgs.; Oct. 2009; Madison, WI.
ICNPS98; Kawamura,Birdsall&Vahedi; "Methods in Speeding Up PIC_MCC Codes Applied to RF Plasma Discharges", http://www.physics.ucla.edu/icnsp/PDF/kawamura.pdf; 4 pgs.; Oct. 1998; Los Angeles, CA.
IAEA/ICTP; Birdsall; "Particle-in-Cell Charged-Particle Sirnulationst Plus Monte Carlo Collisions With Neutral Atoms, PIC-MCC", IEEE Trans. Plasma Sci., vol. 19, No. 2; pp. 65-85; 1995; Trieste, Italy.
University of Wisconsin; Kulcinski et al; "11th US-Japan Workshop on Inertial Electrostatic Confinement Fusion", Workshop Agenda; 2 pgs.; Oct. 2009; Madison, WI.
Kyoto University; Kulcinski et al; "10th US-Japan Workshop on Inertial Electrostatic Confinement Fusion", Workshop Agenda; Dec. 2008; 3 pgs.; Kyoto, Japan.
Askmar; Duncan; "Should Google Go Nuclear", Bussard's Google Tech-Talk, http://www.askmar.com/ConferenceNotes/Should%20Google%20Go%20Nuclear.pdf; 25 pgs.; Nov. 9, 2008; Mountain View, CA.
Bellsouth; Rogers; "Hi Doc and all", author-annotated email to Bussard, Nebel, Ligon & Rusi; 2 pgs.; 13:10 Jun. 18, 2007; Big Pine Key, FL.
Kazemyzade, F.; "Dependence of Potential Well Depth on the Magnetic Field Intensity in a Polywell Reactor"; Journal of Fusion Energy; Oct. 12, 2011; 5 pgs.; 10-4; Springer LLC.
Rider, Todd H.; "Is There a Better Route to Fusion"; (s16)"Required Power to Maintain . . . "; longwood.edu/assets/chemphys/FusionRoute.pdf; Apr. 1, 2005; 26pgs.
Rogers, Joel G.; "A 'Polywell' p+11B Power Reactor"; 13th US-Japan Workshop on IECF; 15pgs.; Dec. 8, 2011; downloaded Mar. 20, 2012 from www.physics.usyd.edu.au/~khachan/IEC2011/Presentations/Rogers_notes.pdf.

* cited by examiner

STURMAN INDUSTRIES
LEADING THE MECHANICAL WORLD INTO THE DIGITAL AGE

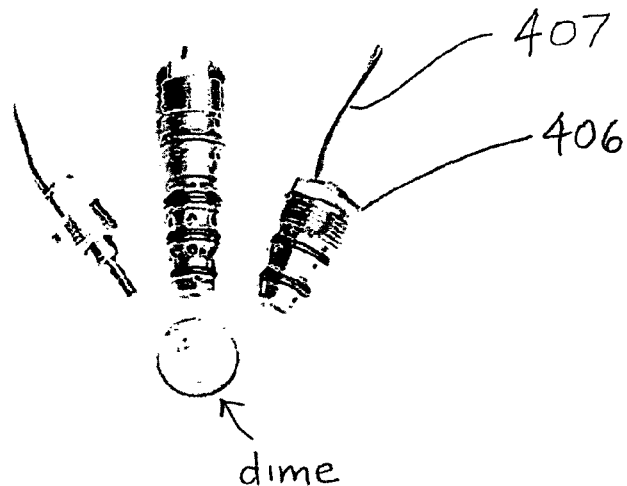

VALVES
 ACTUATORS
 & ELECTRONICS

STURMAN PRODUCTS

- Hydraulic Valves
- Pneumatic Valves
- Actuators
- Electronic Controls

VALVES AND ACTUATORS

Our electro-magnetic valve and actuator technology is typically superior in performance and cost. We have standard components available and we also specialize in application engineering. We can work with you to provide a valve or actuator ideally matched to your needs or apply our experience and expertise to a full system to garner the maximum benefit of our technology for your product.

TECHNOLOGY BENEFITS

- High switching speed = 300 microseconds
    - Small size
    - Low mass
- Small package
- Low electrical power usage
    - Excellent heat dissipation
- Stable low or zero energy states

FIG. 4B

Email: sales@gmw.com   Telephone: USA +650-802-8292   Advanced
Search

GMW Electromagnet Coils

Overview Specifications Accessories Tech Support Pricing

GMW standard Electromagnet Coils are designed for high reliability and high fields at modest power consumption. They are wound from precision slit, high conductivity copper with mylar interturn insulation and a fibreglass outer wrap. They feature separate aluminum heat sinks with integrated copper cooling tubes. The complete coil assembly in then vacuum impregnated with epoxy resin to produce a void free structure that will not degrade under continuous or cycled operation at maximum power dissipation. Protective overtemperature switch interlocks are mounted on all heat sinks.

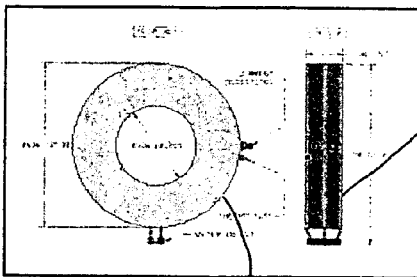
— 412

| Specifications - Electromagnet Coils | | | | | |
|---|---|---|---|---|---|
| | 11801520 | 11901110 | 11801862 | 11801362 | 11801650 |
| Electrical | | | | | |
| Maximum Field | 0.06T | 0.12T | 0.18T | 0.14T | 0.13T |
| Maximum DC Power | 110W (5A, 22V) | 600W (50A, 12V) | 1.75kW (70A, 25V) | 2.1kW (70A, 30V) | 5.18kW (140A, 37V) |
| Inductance | 90mH | 20mH | 50mH | 60mH | 60mH |
| Resistance At 20°C Maximum | 3.65Ω 4.4Ω | 0.225Ω 0.275Ω | 0.295Ω 0.355Ω | 0.36Ω 0.435Ω | 0.22Ω 0.27Ω |
| Water Cooling | 1 liters/min 0.1 bar | 2 liters/min 0.2 bar | 6 liters/min 1.0 bar | 6 liters/min 1.0 bar | 15 liters/min 1.0 bar |
| Turns | 950 | 344 | 460 | 460 | 360 |
| Mechanical | | | | | |
| Inside Diameter | 47mm | 93mm | 115mm | 166mm | 306mm |
| Outside Diameter | 165mm | 270mm | 345mm | 395mm | 636mm |
| Thickness | 56mm | 107mm | 133mm | 133mm | 140mm |
| Mass | 10kg | 30kg | 64kg | 75kg | 206kg |
| Specifications are subject to change without notice. | | | | | |

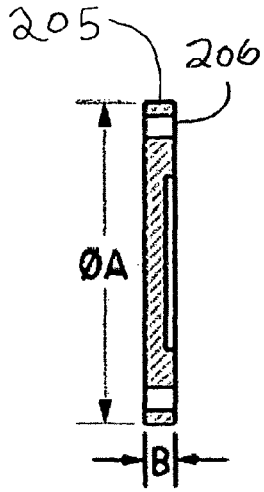

BLANK FLANGE - BOLTED ALUMINUM

| PART NUMBER | A | B |
|---|---|---|
| ISO-B63-250-AB | 5.12 | .47 |
| ISO-B80-300-AB | 5.71 | .47 |
| ISO-B100-400-AB | 6.50 | .47 |
| ISO-B160-600-AB | 8.86 | .63 |
| ISO-B200-800-AB | 11.22 | .63 |
| ISO-B250-1000-AB | 13.19 | .63 |
| ISO-B320-1200-AB | 16.73 | .79 |
| ISO-B400-1600-AB | 20.08 | .79 |
| ISO-B500-2000-AB | 24.02 | .79 |

BLANK FLANGE - BOLTED - 304 STAINLESS

| PART NUMBER | A | B |
|---|---|---|
| ISO-B63-250-SB | 5.12 | .47 |
| ISO-B80-300-SB | 5.71 | .47 |
| ISO-B100-400-SB | 6.50 | .47 |
| ISO-B160-600-SB | 8.86 | .63 |
| ISO-B200-800-SB | 11.22 | .63 |
| ISO-B250-1000-SB | 13.19 | .63 |
| ISO-B320-1200-SB | 16.73 | .79 |
| ISO-B400-1600-SB | 20.08 | .79 |
| ISO-B500-2000-SB | 24.02 | .79 |

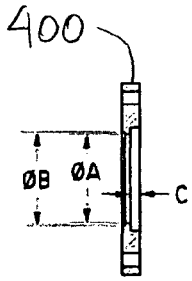

WELD FLANGE - BOLTED

| PART NUMBER | TUBE OD | A | B | C |
|---|---|---|---|---|
| ISO-B63-250-SF | 2.50" | 2.37 | 2.51 | .25 |
| ISO-B80-300-SF | 3.00" | 2.87 | 3.01 | .25 |
| ISO-B100-400-SF | 4.00" | 3.87 | 4.01 | .25 |
| ISO-B160-600-SF | 6.00" | 5.83 | 6.02 | .25 |
| ISO-B200-800-SF | 8.00" | 7.76 | 8.02 | .25 |
| ISO-B250-1000-SF | 10.00" | 9.75 | 10.02 | .25 |
| ISO-B320-1200-SF | 12.75" | 12.42 | 12.77 | .38 |
| ISO-B400-1600-SF | 16.00" | 15.62 | 16.02 | .38 |
| ISO-B500-2000-SF | 20.00" | 19.62 | 20.02 | .38 |

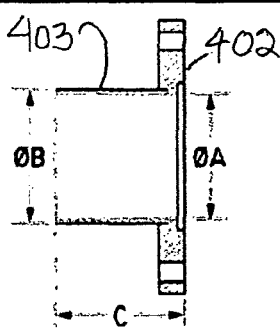

LONG BUTT FLANGE - BOLTED - 304 STAINLESS

| PART NUMBER | TUBE OD | A | B | C |
|---|---|---|---|---|
| ISO-B63-250-ISO | 2.50" | 2.37 | 2.50 | 3.94 |
| ISO-B80-300-ISO | 3.00" | 2.87 | 3.01 | 3.94 |
| ISO-B100-400-ISO | 4.00" | 3.87 | 4.00 | 3.94 |
| ISO-B160-600-ISO | 6.00" | 5.83 | 6.00 | 3.94 |
| ISO-B200-800-ISO | 8.00" | 7.76 | 8.00 | 3.94 |
| ISO-B250-1000-ISO | 10.00" | 9.75 | 10.00 | 3.94 |
| ISO-B320-1200-ISO | 12.75" | 12.42 | 12.75 | 3.94 |
| ISO-B400-1600-ISO | 16.00" | 15.62 | 16.00 | 3.94 |
| ISO-B500-2000-ISO | 20.00" | 19.62 | 20.00 | 3.94 |

FIG. 4E

Half Nipples
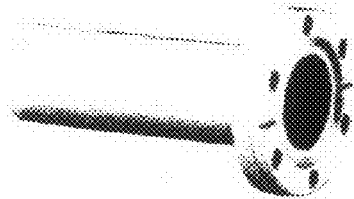
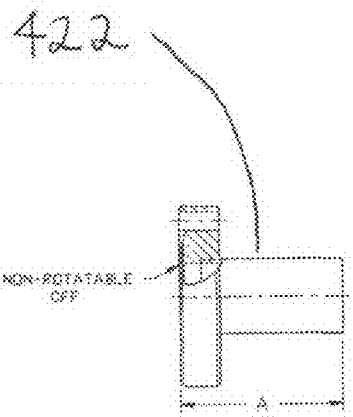
FIG. 4F

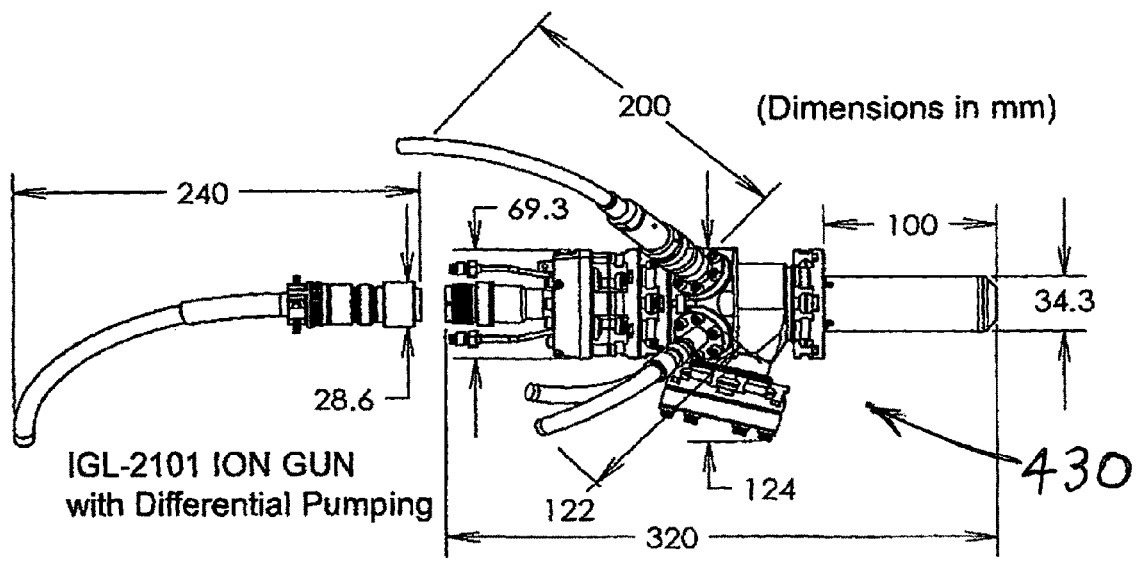

IGL-2101 ION GUN
with Differential Pumping

ION BEAM ENERGY
Standard: 10 eV to 1 keV (Independently adjustable)
Optional: 10 eV to 5 keV BEAM CURRENT
1 nA to 100 nA (Independently adjustable) — 432

ENERGY SPREAD
Less than 5 eV at low currents, calculated

ION SPECIES
Inert gases, some active gases

ION GENERATION METHOD
Electron impact ionization of gas admitted though
the auxiliary gas inlet SPOT SIZE
1 mm to 20 mm (Independently adjustable)

WORKING DISTANCE
Range: 5 mm to 100 mm
20 mm recommended for very low energy operation

OOPIC Pro ™

User's Guide ~ 700

Version 1.0

3  INTRODUCTION                                                                                                          10

3 Introduction

OOPIC Pro is a is a feature-rich 2D particle-in-cell (PIC) simulator. It is designed to model plasmas, beams of charged particles, externally generated electric and magnetic fields, and low-to-moderate density neutral gases, using a wide variety of boundary conditions. It includes electrostatic and electromagnetic field solvers, as well as support for x-y (slab) and r-z (cylindrical) geometries. OOPIC Pro provides a convenient and intuitive GUI for use on Microsoft®Windows®[1], Mac OS X[2], and Linux systems, as well as a batch mode to run jobs from the command line.

The OOPIC physics kernel has been used by researchers around the world since 1995 to simulate a wide range of challenging problems. These include plasma display panels, ion implantation, high-power microwave devices, and next-generation particle accelerator concepts. The code is somewhat rare among PIC simulations in its ability to handle ionization of background neutral gasses via electron impact or field-induced tunneling effects. More detailed information is provided by Ref. 1 and 2 in Section 11.

Tech-X Corporation
5621 Arapahoe Avenue, Suite A
Boulder, CO 80303
http://www.txcorp.com
info@txcorp.com

FIG. 7

```
CF1pm.inp ── 802
{ ──────── 804                            ┌── 800
Joel G. Rogers CF1 for Canadian Fusion Device, model-1, is an IEC fusion energy scale model
the same size as the WB-6 model of the late Robert Bussard, EMC2fusion.org.

The time sequence modeled is:
        1. Fast (ca. 10keV) electrons enter the fusor core in multiple beams.
        2. Ions enter from internal guns or neutral gas ionization.
        3. Electrons+ions are confined by B-fields; electrons recirculate.
        4. Confined ions/electrons oscillate through the center of the core.
        5. Diagnostics record electrons/ion's loss factors, enegies, etc.

Created Oct. 1, 2007
modified Oct. 8, 2007. Added analytic B-field from top/bot coils.
Oct. 10, Removed CurrentRegions, replaced them by 8 wire B-fields,
and added diagnostics of rho at center and in cusp line.
Oct. 12, Add ion emitter on inside face of right magnet box.
Oct. 14, Convert to electromagnetic mode for diamagnetism
Oct. 15, Add three e-guns and remove ISO Flange from simulation
Oct. 17, Remove ion emitter
Oct. 19, Change tank to Conductor instead of Equipotential
Oct. 23, Surround the tank with a border. Add temp. Add Gaps.
Oct. 30, Add I accumulator to tank/mags. Add chamfer to mags(log p.96)
Oct. 31, Add negative bias to tank wall. Reset to 0, did no good.
Nov.  2, Switch to electrostatic model for speed. Then back to EM
Nov.  4, Expand gas region to full tank, try lower elecEnergy
Nov.  7, Add Load function to investigate steady state densities
Nov. 11, Modify Load functions to duplicate steady-state velocities
Nov. 12, Add 4 ion emitters (undoing Oct17).
Nov. 17, Add analyticF to MCC & ideal gas law; should fix gasOffTime
Nov. 30, Add ramp-up time to e-drive current, all 4 guns the same
Dec.  5, Shrink MCC region and move to edge of well
Jan.  3, Round off magnet dimensions to even multiple of cellSize
Jan.  5, Define separate np2cIons.
Jan. 11, Add corner chamfer to vacuum tank
Jan. 13, CF1jy = drop electron drive current to a0 after specified time
Jan. 16, Fiddle round-off error for ion emitter offset in emitPort
Jan. 18, Omit extra "normal=" code from all but emitters
Jan. 25, Move ion emitters inward by adding ionRadialOffset
Jan. 29, Debug tpulse for ion turnoff
Feb.  4, Testing in new 2.53GHz P4 Compaq
Feb.  6, EM mode
Feb.  7, Symmetrize emitters and tank wall with zeroOffset
Feb. 10, Omit top and bottom coils ala red logbook pg.15,18
Mar. 18, Change magBox to Conductor. Nope, eguns paralyze
Mar. 19, Add gasEScale = scale for R egun to slow MCC rate
Mar. 25, Add separate time control for R egun, to ditto          804
Mar. 31, Change MCC e/ions to MCCelectrons & ions
Apr.  1, Decrease cellSize .01 to .005 for heating. Slow.
Apr.  2, Homogenize initial e,i loads 1/6 each direction
Apr. 28, Add 4 more i-guns inside to speed neutralization
                                                                 806
} // end of Description block
Variables                                                        807
{
  Mu   = 4*PI*1e-7       // Permeability of free space in SI units
  np2c = 2e8             // particles/cell in e-Emitter. Default=1e6   808
  np2cIons = np2c        // ditto for ions
```

FIG. 8

```
max_In_Specie = 1e8      // Max limit in species. Default=1e8
max_In_Simulation = 1e6  // Cuts particles' # by 1/2 for speed. Default=1e8
diameterInCells = 80     // Square region of this dimension
cellSize = .01 // MKS simulation cell size
timeStep = (cellSize/.01)*1.5e-11 // txcorp.com recommended this
cutCornerSide = 0*cellSize // 45deg diagonal tank corner
x1origin = cellSize*(diameterInCells/2)     // x1 MKS origin position
x2origin = x1origin      // Square dimension
zeroOffset = (cellSize/2)*0.99 // Origin offset with 1% rounding adj.
.
.
} // end variables block
//
Region                   // One and only
{
Grid
{
J = diameterInCells      // Required cell diameter
x1s = zeroOffset         // Required origin in meters (avoids x1,x2=0)
x1f = diameterInCells*cellSize+zeroOffset // Required upper limit
K = diameterInCells      // Square
x2s = zeroOffset
x2f = diameterInCells*cellSize+zeroOffset
Geometry = 1             // Required specifier; selects Cartesian geometry
n1 = 1.
n2 = 1.                  // n1, n2 non-unity means nonlinear x,y scales
} // end Grid
Control
{
dt = timeStep            // "timeStep" or literal is required here
ElectrostaticFlag = 1    // =1 for electrostatic
particleLimit = max_In_Simulation
.
.
} // end Control
Species
{
 name = electrons
 m = 9.11E-31
 q = -1.6e-19
 particleLimit = max_In_Specie
 collisionModel = 1
}
Species
{
 name = ions
 m = 1.66e-27*2.01       //deuterium mass
 q = 1.6e-19
 particleLimit = max_In_Specie
 collisionModel = 2
 subcycle = 33           // sqrt(mD/me) from dcdis.inp example
}
.
.
.
```

FIG. 8A

```
.
.
// Electron beam parameters ╱―― 800                              ―― 826
  elecEnergy = 15000.           // Inside electron energy in electron-volts    ―― 830
  elecInjectionEnergy = 100.    // eV out of e-gun                             828
  elecIgnitionCurrent = 20.     // Ignition Amps initial current, must .ne. 0  832
  elecIgnitionTime = 1.00       // Duration of initial on-time in seconds
  elecHoldingCurrent = 1.       // after which the current is this in Amps    834
  elecIgnitionCurrentR = elecIgnitionCurrent //.ne. 0; "R" egun hits NG region
  elecIgnitionTimeR = elecIgnitionTime // Duration of R on-time in seconds
  elecHoldingCurrentR = elecHoldingCurrent // after which the current is this(A)
//                                                                            836
// Electron gun parameters
  emitCFLength = 0*2.46*.0254   // Standard 2.75CF stub length multiple
  emitCFDiameter = 2.75*.0254   // Diameter of mounting flange
  emitCathodeDia2 = .01         // e-emitter half-diameter
  emitTemp = .025*00/300        // EV from cathode temp, typ. 1200deg K  ―― 838
//
.                                                                       ―― 840
.
EmitPort        // Right electron gun w/variable grid-v & divergence
{
  name = rightElectronEmitter
  normal = -1    // normal = velocity direction
  C = elecIgnitionCurrentR       // scale this one only for MCC
  A1 = 2*x1origin-cellSize-emitCFLength // Emitters on CF flange
  A2 = x2origin-emitCathodeDia2  // central cell minus side cells
  B1 = 2*x1origin-cellSize-emitCFLength // vertical emitter           }← 842
  B2 = x2origin+emitCathodeDia2  // central cell plus side cell
  units = EV     // Units of velocity below
  v1drift = -elecInjectionEnergy
  v2thermal = emitTemp                      ―― 844
  speciesName = electrons
  np2c = np2c
  tpulse = elecIgnitionTimeR
  a0 = elecHoldingCurrentR/(elecIgnitionCurrentR)
} // end rightElectronEmitter
Gap             // Fix voltage on emitter above                       ―― 846
{
  name = rightElectronGap
  normal = 1     // to clear electron direction
  C = 0
  A1 = 2*x1origin-cellSize-emitCFLength // Emitters inset from CF flange
  A2 = x2origin-emitCathodeDia2
  B1 = 2*x1origin-cellSize-emitCFLength // vertical emitter
  B2 = x2origin+emitCathodeDia2 // symmetrical up-down
} // end Gap                                                          ―― 848
EmitPort        // Top
{                                                                     ―― 850
  name = topElectronEmitter
  normal = -1    // normal = velocity direction
  C = elecIgnitionCurrent
.
.
.
```

FIG. 8B

```
diameterInCells = 80   // Square region of this dimension ——— 854
cellSize = .01  // MKS simulation cell size
timeStep = (cellSize/.01)*1.5e-11 // txcorp.com recommended this ——— 856
cutCornerSide = 0*cellSize // 45deg diagonal tank corner
x1origin = cellSize*(diameterInCells/2)      // x1 MKS origin position ⎫ 858
x2origin = x1origin     // Square dimension                            ⎬
zeroOffset = (cellSize/2)*0.99 // Origin offset with 1% rounding adj.  ⎭
//                                                                        859
.
.
Conductor              // Define square tank with emitters inset ——— 860
{
 name = tankWall
 C = 0                 // Ground = emitter voltage too ——— 862
 IdiagFlag = 1         // Accumulate spill on the next segment ⎫ 866
 Ihist_avg = 1e-8/timeStep // 10 ns time bins, scaled from dt  ⎬ 864
 Ihist_len = 10000     // Time bins in above units             ⎭
 nxbins = 10           // # spatial bins along boundary segment
 Segment               // Start from LR corner ——— 868
 {
  A1 = 2*x1origin-cellSize
  A2 = cellSize+cutCornerSide
  B1 = 2*x1origin-cellSize            // Vertical right wall
  B2 = x2origin-emitCFDiameter/2
 }
 Segment                              ——— 872
 {
  A1 = 2*x1origin-cellSize
  A2 = x2origin-emitCFDiameter/2
  B1 = 2*x1origin-cellSize-emitCFLength
  B2 = x2origin-emitCFDiameter/2      // Horizontal stub in
 }
 Segment
 {
  A1 = 2*x1origin-cellSize-emitCFLength
  A2 = x2origin-emitCFDiameter/2
  B1 = 2*x1origin-cellSize-emitCFLength // Vertical emitter flange
  B2 = x2origin+emitCFDiameter/2
 }                                                                    870
 Segment
 {
  A1 = 2*x1origin-cellSize-emitCFLength
  A2 = x2origin+emitCFDiameter/2
  B1 = 2*x1origin-cellSize
  B2 = x2origin+emitCFDiameter/2      // Horizontal emitter stub
 }
 Segment
 {
  A1 = 2*x1origin-cellSize
  A2 = x2origin+emitCFDiameter/2
  B1 = 2*x1origin-cellSize            // Vertical tank wall
  B2 = 2*x2origin-cellSize-cutCornerSide
 }
 Segment                              // UR corner diagonal
 {
  A1 = 2*x1origin-cellSize
  A2 = 2*x2origin-cellSize-cutCornerSide
  B1 = 2*x1origin-cellSize-cutCornerSide
  B2 = 2*x2origin-cellSize
 }
```

```
// c.f. GMW#11801862 coil spec and blue log pg. 25 for possible PI/2 factor.
magID = .115            // rounded up from .115 to multiple of 4(*cellSize)
magOD = .345            // .345 rounded up to multiple of 4
magHeight = .06         // .133 rounded up to be multiple of 2
magCornerGap = 0.01     // Corner-cusp recirculation goes through this gap
magBoxWall = .0         // Can allow space for air cooling inside mag box
magChamferIn = 0.02     // H/2 is maximum leaving 2nd pancake intact
magChamferOut = magChamferIn // 45deg triangle has 2 equal sides
.
// Define magnet box potential. 8 sections of 5 segment-boxes
Equipotential
{
 name = magBox
 er = 0                          // Conductor
 C = elecEnergy
  IdiagFlag = 1                  // Accumulate spill on this surface
  Ihist_avg = 1e-8/timeStep      // 10 ns time bins, scaled from dt
  Ihist_len = 10000              // Time bins in above units
  nxbins = 10                    // # spatial bins along boundary segment
 // Start w/Bottom magnet - left coil
 Segment
 {
  A1 = x1origin-magID/2+magBoxWall
  A2 = x2origin-magOD/2-magBoxWall-magCornerGap
  B1 = x1origin-magOD/2-magBoxWall+magChamferIn
  B2 = x2origin-magOD/2-magBoxWall-magCornerGap // Horizontal inside
 }
 Segment
 {
  A1 = x1origin-magOD/2-magBoxWall
  A2 = x2origin-magOD/2-magBoxWall-magCornerGap-magChamferOut
  B1 = x1origin-magOD/2-magBoxWall                // Vertical outside
  B2 = x2origin-magOD/2-3*magBoxWall-magCornerGap-magHeight
 }
 Segment
 {
  A1 = x1origin-magOD/2-magBoxWall
  A2 = x2origin-magOD/2-3*magBoxWall-magCornerGap-magHeight
  B1 = x1origin-magID/2+magBoxWall
  B2 = x2origin-magOD/2-3*magBoxWall-magCornerGap-magHeight // Horizontal outside
 }
 Segment
 {
  A1 = x1origin-magID/2+magBoxWall
  A2 = x2origin-magOD/2-3*magBoxWall-magCornerGap-magHeight
  B1 = x1origin-magID/2+magBoxWall                // Vertical inside
  B2 = x2origin-magOD/2-magBoxWall-magCornerGap
 }
 Segment                         // Diagonal chamfer
 {
  A1 = x1origin-magOD/2-magBoxWall+magChamferIn
  A2 = x2origin-magOD/2-magBoxWall-magCornerGap
  B1 = x1origin-magOD/2-magBoxWall
  B2 = x2origin-magOD/2-magBoxWall-magCornerGap-magChamferOut
 }
 Segment                         // Bottom-right magnet box
 {
```

FIG. 8D

```
// Coil magnets' descriptions. See blue log frontpiece for geometry drawing.
  magField = 1.0            // kG c.f. max cooling limit = 1.8kG
  magCurrent = (magField*460*70/1.8) // Scale field by ratio of A-turn/Field
// c.f. GMW#11801862 coil spec and blue log pg. 25 for possible PI/2 factor.
  magID = .115              // rounded up from .115 to multiple of 4(*cellSize)
  magOD = .345              // .345 rounded up to multiple of 4
  magHeight = .06           // .133 rounded up to be multiple of 2
  magCornerGap = 0.01       // Corner-cusp recirculation goes through this gap
  magBoxWall = .0           // Can allow space for air cooling inside mag box
  magChamferIn = 0.02       // H/2 is maximum leaving 2nd pancake intact
  magChamferOut = magChamferIn // 45deg triangle has 2 equal sides
.
.
.
// Wire coordinates for 8 coil crossings, starting Bottom-Left coil.
  X9 = x1origin             // Shorten these names to fix line overflows below
  Y9 = x2origin
  wS = Mu*magCurrent/2/PI   // B-field from wire per distance from wire
// Tabulate the wire positions = centers of 8 magnet boxes
  X1 = -(magID/4+magOD/4-(magID/4+magOD/4)%cellSize)
  Y1 = -(magOD/2+2*magBoxWall+magCornerGap+magHeight/2-
(magOD/2+2*magBoxWall+magCornerGap+magHeight/2)%cellSize)
  X2 =  (magID/4+magOD/4-(magID/4+magOD/4)%cellSize)
  Y2 = -(magOD/2+2*magBoxWall+magCornerGap+magHeight/2-
(magOD/2+2*magBoxWall+magCornerGap+magHeight/2)%cellSize)
  X3 =  (magOD/2+2*magBoxWall+magCornerGap+magHeight/2-
(magOD/2+2*magBoxWall+magCornerGap+magHeight/2)%cellSize)
  Y3 = -(magID/4+magOD/4-(magID/4+magOD/4)%cellSize)
  X4 =  (magOD/2+2*magBoxWall+magCornerGap+magHeight/2-
(magOD/2+2*magBoxWall+magCornerGap+magHeight/2)%cellSize)
  Y4 =  (magID/4+magOD/4-(magID/4+magOD/4)%cellSize)
  X5 =  (magID/4+magOD/4-(magID/4+magOD/4)%cellSize)
  Y5 =  (magOD/2+2*magBoxWall+magCornerGap+magHeight/2-
(magOD/2+2*magBoxWall+magCornerGap+magHeight/2)%cellSize)
  X6 = -(magID/4+magOD/4-(magID/4+magOD/4)%cellSize)
  Y6 =  (magOD/2+2*magBoxWall+magCornerGap+magHeight/2-
(magOD/2+2*magBoxWall+magCornerGap+magHeight/2)%cellSize)
  X7 = -(magOD/2+2*magBoxWall+magCornerGap+magHeight/2-
(magOD/2+2*magBoxWall+magCornerGap+magHeight/2)%cellSize)
  Y7 =  (magID/4+magOD/4-(magID/4+magOD/4)%cellSize)
  X8 = -(magOD/2+2*magBoxWall+magCornerGap+magHeight/2-
(magOD/2+2*magBoxWall+magCornerGap+magHeight/2)%cellSize)
  Y8 = -(magID/4+magOD/4-(magID/4+magOD/4)%cellSize)
} // end Variables block
.
.
.
// Impress in-plane B-fields from 8 wires perpendicular to slab
  B01analytic = wS*(-(x2-Y9-Y1)/((x1-X9-X1)^2+(x2-Y9-Y1)^2)+
(x2-Y9-Y2)/((x1-X9-X2)^2+(x2-Y9-Y2)^2)- (x2-Y9-Y3)/((x1-X9-X3)^2+(x2-Y9-Y3)^2)+
(x2-Y9-Y4)/((x1-X9-X4)^2+(x2-Y9-Y4)^2)- (x2-Y9-Y5)/((x1-X9-X5)^2+(x2-Y9-Y5)^2)+
(x2-Y9-Y6)/((x1-X9-X6)^2+(x2-Y9-Y6)^2)- (x2-Y9-Y7)/((x1-X9-X7)^2+(x2-Y9-Y7)^2)+
(x2-Y9-Y8)/((x1-X9-X8)^2+(x2-Y9-Y8)^2))
  B02analytic = wS*((x1-X9-X1)/((x1-X9-X1)^2+(x2-Y9-Y1)^2)-
(x1-X9-X2)/((x1-X9-X2)^2+(x2-Y9-Y2)^2)+ (x1-X9-X3)/((x1-X9-X3)^2+(x2-Y9-Y3)^2)-
(x1-X9-X4)/((x1-X9-X4)^2+(x2-Y9-Y4)^2)+ (x1-X9-X5)/((x1-X9-X5)^2+(x2-Y9-Y5)^2)-
(x1-X9-X6)/((x1-X9-X6)^2+(x2-Y9-Y6)^2)+ (x1-X9-X7)/((x1-X9-X7)^2+(x2-Y9-Y7)^2)-
(x1-X9-X8)/((x1-X9-X8)^2+(x2-Y9-Y8)^2))
} // end Control
```

FIG. 8E

```
// Ion emitter parameters
 ionEmitterOffset = -.005      // Distance of emitter toward coil center
 ionRadialOffset = 0           // Distance radially in from inner coil face
 ionCathodeDia2 = 0.005        // Half-height extent of emitter
 ionInjectionEnergy = 100.     // Initial inward velocity (eV) of ions
 ionIgnitionCurrent = 1.5      // Amps singly charged ions
 ionIgnitionDelay = 0.1e-6     // Gives well this amount of time to form
 ionRiseTime = 0.              // ion current risetime after above delay
 ionIgnitionTime = 1           // ion beam-on duration (s)
 ionHoldingCurrentFraction = .0 // fraction of IgnitionCurrent before&after
 ionRightMultiplier = 1.       // Current scaling for turning on/off 4 ion guns
 ionTopMultiplier = 1.
 ionLeftMultiplier = 1.
 ionBottomMultiplier = 1.
 .
 .
 .
EmitPort          // ion gun, similar to electron's but located inside
{
 name = rightIonEmitter
 normal = -1
 A1 = x1origin+magOD/2+magBoxWall+magCornerGap-ionRadialOffset
 A2 = x2origin+magID/2-magBoxWall-ionEmitterOffset-ionCathodeDia2
 B1 = x1origin+magOD/2+magBoxWall+magCornerGap-ionRadialOffset
 B2 = x2origin+magID/2-magBoxWall-ionEmitterOffset+ionCathodeDia2
 units = EV
 v1drift = -ionInjectionEnergy
 speciesName = ions
 np2c = np2cIons
 C = ionIgnitionCurrent*ionRightMultiplier
 tdelay = ionIgnitionDelay
 trise = ionRiseTime
 tpulse = ionIgnitionTime
 a0 = ionHoldingCurrentFraction
} // end ion BeamEmitter
Gap                // Fix voltage on emitter above
{
 name = rightIonGap
 normal = 1
 A1 = x1origin+magOD/2+magBoxWall+magCornerGap-ionRadialOffset
 A2 = x2origin+magID/2-magBoxWall-ionEmitterOffset-ionCathodeDia2
 B1 = x1origin+magOD/2+magBoxWall+magCornerGap-ionRadialOffset
 B2 = x2origin+magID/2-magBoxWall-ionEmitterOffset+ionCathodeDia2
 C = elecEnergy          // voltage same as adjacent magBox
} // end Gap
EmitPort          // 2nd right ion gun
{
 name = rightIonEmitter2
 .
 .
 .
```

FIG. 8F

```
// Gas ionization via MCC below. Choose gasPressure 1e-11 to disable MCC
 gasDimension = .2       // Side dimension of square region w/gas inside
 gasInset = magID/2      // Space inside magnets
 gasPressure = 1e-6      // 2*(D2 pressure in Torr)
 gasTemp = .025          // eV room temperature
 gasDensity = gasPressure*(2*6.02e23)/(760*.0224) // atoms/m^3 ideal gas
 ecxFactor = 100         // multiplies MCC ionization cross section
.
.
.
MCC                      // In beam and in face cusp
{
 gas = H
 pressure = gasPressure
 temperature = gasTemp
 analyticF = gasDensity
 eSpecies = MCCelectrons
 ecxFactor = ecxFactor              // increase ionization to speed injection
 iSpecies = MCCions
 x1MinMKS = x1origin+(magID/2+2*magBoxWall+magCornerGap-gasInset)-gasDimension/2
 x1MaxMKS = x1origin+(magID/2+2*magBoxWall+magCornerGap-gasInset)+gasDimension/2
 x2MinMKS = x2origin-gasDimension/2
 x2MaxMKS = x2origin+gasDimension/2
} // end MCC
```

```
// Load parameters
  iLoadSize = .10                              // Square near center to force radial flow
  eLoadSize = iLoadSize*1.05
  eLoadTemp = 10000
  iLoadTemp = 8000                             // Simulate 80% well depth
  eLoadDensity = 0                             // Change "0" to "1e18" to enable Loading
  iLoadDensity = eLoadDensity                  // neutral plasma
.
.
// Following are 12 blocks to isotropically load ions and electrons
Load              // Ions
{
// name = ions1 // this line chokes compiler, contrary to Users manual
  speciesName = MCCions
  units = EV
  density = iLoadDensity/6
  vldrift = iLoadTemp
  np2c = np2cIons
  x1MinMKS = x1origin-iLoadSize/2
  x1MaxMKS = x1origin+iLoadSize/2
  x2MinMKS = x2origin-iLoadSize/2
  x2MaxMKS = x2origin+iLoadSize/2
}
Load              // electrons
{
  speciesName = MCCelectrons
  units = EV
  density = eLoadDensity/6
  vldrift = eLoadTemp
  np2c = np2c
  x1MinMKS = x1origin-eLoadSize/2
  x1MaxMKS = x1origin+eLoadSize/2
  x2MinMKS = x2origin-eLoadSize/2
  x2MaxMKS = x2origin+eLoadSize/2
}
Load              // Ions2
{
  speciesName = MCCions
  units = EV
  density = iLoadDensity/6
  vldrift = -iLoadTemp
  np2c = np2cIons
  x1MinMKS = x1origin-iLoadSize/2
  x1MaxMKS = x1origin+iLoadSize/2
  x2MinMKS = x2origin-iLoadSize/2
  x2MaxMKS = x2origin+iLoadSize/2
}
.
.
```

FIG. 8H

MODULAR APPARATUS FOR CONFINING A PLASMA

CROSS-REFERENCE TO RELATED APPLICATIONS

Not Applicable

FEDERALLY SPONSORED RESEARCH

Not Applicable

SEQUENCE LISTING OR PROGRAM

Source File CF1pm.txt is on CD ROM

BACKGROUND

1. Field of the Invention

This invention relates to nuclear energy generating devices, specifically to a hardware module for confining and heating a plasma inside a nuclear energy device.

2. Prior Art

Scientific Background for Nuclear Power Generation

Fossil fuels burn by recombining chemical elements into new molecules. Nuclear fuels "burn", in the sense of recombining the particles in nuclei into new nuclei.

Nuclear fuels have certain advantages over fossil fuels. Burning nuclear fuel does not produce carbon dioxide. Nuclear fuel is cost effective to store and transport.

Nuclear energy devices are either fission devices or fusion devices. A "nuclear reactor" is commonly a fission type power plant. Uranium or plutonium is input to the reactor as fuel. Neutrons induce the fuel nuclei to fission, in other words, to break apart. Each nucleus that fissions liberates a large amount of heat energy. Many millions of fission reactions happen each second to produce megawatts of heat. Heat energy is converted into electric power by turbines and generators.

Nuclear reactors produce harmful chemical wastes. The danger of a meltdown, such as at Three Mile Island or Chernobyl, is always a worry. For these reasons, nuclear reactors have not competed successfully with fossil fuel power plants.

Fusion has potential advantages over fission. Fusion energy devices do not produce toxic wastes and do not melt down. Fusion reactors burn plentiful elements, such as hydrogen or boron. Pairs of these light elements fuse, in other words join together, to form new nuclei and possibly also neutrons. As a by-product of the fusion reaction a relatively large amount of useable energy is released. Common fusion energy devices utilize a plasma to supply the fuel to be fused. A plasma is a gaseous cloud of charged particles, including electrons and/or ions. Ions are the nuclei of fuel atoms which have been stripped of their electrons. The fusion energy device confines the hot plasma inside a vacuum tank.

Energy flows out of the plasma and is converted to electric power. The plasma must be heated to a high temperature, be confined for a long time, and be maintained at a high density. These 3 measures of the confined plasma, 1) temperature, 2) confinement-time, and 3) density, when multiplied together determine the rate of power output. The higher the power output of a plasma energy device, the better the device will compete with fossil-fueled power plants.

The tokamak is the most common fusion energy device on earth. A hot plasma is confined by electromagnets inside a large donut-shaped vacuum tank. Tokamaks were invented in the 1950's in Russia. Powerful electromagnets steer ions away from the vacuum tank walls. At high density and temperature, the loss rate of ions becomes excessive. Replacing these lost ions consumes more power than the device produces from fusion. The power-in to power-out balance never reaches the break-even point. Efforts to solve this problem have led to constructing bigger and more expensive prototypes. The most recent tokamak prototype is currently ITER, being constructed in France. ITER will cost $10 billion to build and operate for 30 years. ITER will still be only a prototype. It is not expected to produce any useable amount of power.

Inertial Electrostatic Confinement of Plasmas—Bussard's Fusor

A promising alternative to the tokamak is disclosed in U.S. Pat. No. 4,826,646(1989) to Robert W. Bussard. This patent describes a plasma energy device which uses the principle of inertial-confinement. The ions of the plasma are confined in an electric field which is approximately spherical(quasi-spherical). The force on each ion points inward toward the center of a quasi-spherical vacuum tank. All the ions travel in and out along radial lines, converging from all directions. The ions are kept away from the outside walls of the vacuum tank by the electric field. At the center, the ions come close together with maximum velocity. Each ion makes many thousands of passes through the center of the sphere until it finally hits another ion and fuses. Fusion energy flows out to the walls of the vacuum tank.

Inertial-confinement is a subclass of plasma fusion energy devices. The device disclosed by Bussard—1989, cited above, is an important example. Another important example is electrostatic confinement developed by Thomas McGuire in his 2007 M.I.T. PhD. thesis entitled "Improved Lifetimes and Synchronization Behavior in Multi-grid Inertial Electrostatic Confinement Fusion Devices". McGuire—2007 analyzes data from prototype testing of an inertial-confinement design originated at M.I.T. The M.I.T. device builds on U.S. Pat. No. 3,664,920(1972) to Robert L. Hirsch. The Hirsch device utilized a spherical grid of fine wires to keep the ions away from the walls of the vacuum tank. However, the wires themselves intercepted too many of the circulating ions. The density and confinement-time in the Hirsch—1972 device never reached high enough values to make practical fusion energy.

In the following discussion the term "fusor" is used to refer to any quasi-spherical plasma fusion energy device based on the principle of inertial-confinement. Patents to Bussard—1989 and Hirsch—1972 disclose the two main examples. Bussard's device also received a trademark "Polywell", abandoned Jun. 18, 1992.

The electric field in the Hirsch—1972 fusor was designed to point directly toward the center of the sphere at all points inside the grid. The M.I.T. fusor replaced Hirsch—1972's spherical grid of wires by multiple concentric grids of wires. Multiple grids added a transverse component to the radial electric field of Hirsch—1972. The extra field component was designed to pull the ions back from hitting the wires. However, attempts to raise the plasma density to practical levels again resulted in a loss of ions.

The cause of the loss was analyzed by McGuire, using a commercial computer simulation program. The computer tracked the positions of millions of simulated ions as they traveled back and forth through the center of the fusor. Simulated ion density was gradually raised by adding more and more ions to the simulation. When the density reached a certain critical value, the ions formed clumps. This clumping order McGuire called "synchronization" in his thesis title. Because clumps had more inertia than individual ions, the electric field could not contain them. Many clumps hit the walls and this loss of ions prevented the density from going higher. McGuire concludes as follows: "Thus, while a low density [fusor] device may theoretically operate at energy break-even or better, there are serious problems with scaling up the density to reach useful reaction rates and powers."

"Break-even" operation is an important goal to prove a fusor works. At break-even a fusor consumes the same amount of power as it produces. Break-even performance is only a short development step away from practical power generation.

McGuire's effort to improve on Hirsch—1972 was unsuccessful. McGuire did prove the value of Particle-in-cell(PIC) simulation as a virtual reduction-to-practice technique. This same technique has been used in designing the apparatus of this patent.

The Bussard fusor differs from the McGuire/Hirsch fusor in two major ways: 1) Bussard's plasma is an almost-neutral mixture of electrons and ions, instead of pure ions as in McGuire/Hirsch; and 2) Bussard's electric field is formed by excess electrons, instead of grid wires. These differences give Bussard—1989 an advantage over McGuire—2007 and Hirsch—1972. This invention improves on Bussard—1989.

The use of a quasi-neutral plasma reduces the electric energy stored in the plasma. Otherwise repulsion of like charges forces the ions apart. In McGuire/Hirsch, the ions tend to run for the walls and hit the wires.

In Bussard—1989 there are no grid wires to impede the flow of ions. The ions return again and again to the center, where they eventually fuse. Input power is spent on supplying extra electrons to replace ones that get lost at the tank walls. Lost electrons require much less energy to replace than lost ions would require. Electrons insulate the ions from seeing the tank walls. This two-layer (electron-ion) feature of Bussard—1989 results in longer ion confinement times and lower input power.

Prior Attempts to Build a Working Scale Model of Bussard's Fusor

From 1989 to 2007, Dr. Bussard worked continuously to try to prove his 1989-invention. He died in 2007, at the age of 89. Prototype testing is still the fulltime occupation of the EMC2 Fusion Development Corporation of Santa Fe, founded by Bussard. Bussard's work from 1989 through 2006 has been continuously reported in many scientific-journal publications and 100 Corporation-internal reports, many of which are 30-plus pages long. The most recent of the publications and the most recent of the internal reports have been selected for analysis here. Bussard's 2006—IAC publication, "The Advent of Clean Nuclear Fusion: Super-Performance Space Power and Propulsion", can be viewed on the Corporate website, emc2fusion.org. This publication shows individual photos of 7 scale-models of various embodiments of Bussard's invention. These models were developed over 11 years of research sponsored by the United States Navy. None of these models made any useful fusion power.

The last and most successful of Bussard's scale models was called WB-6. WB stands for WiffleBall. The toy WiffleBall has a similar topological shape to the confining magnetic field of the fusor. WB-6 was reported in 2006—IAC as making measurable fusion. The publication states that 3 neutrons were detected in one test in November, 2005. During this test one of the magnet wires in the fusor melted before the test was completed. No further neutron detections have been reported by the EMC2 Fusion Corporation.

The final test of WB-6 used deuterium(D) fuel. D+D fusion produces a neutron half the time. By measuring the rate at which neutrons come out of the fusor, the experimenter computed the rate of fusions occurring in the center of the device. This rate-computation included a factor of 2 in order to account for D+D fusion which does not make a neutron. The computation also took into account inefficiency of neutron detection, detector solid-angle, and other factors familiar to one skilled in the science of neutron detection.

The neutron detectors might have counted electronic noise and cosmic rays which can cause fake counts. It is usual practice to repeat the measurement without the neutrons. Turning off the neutrons could have been accomplished by replacing the deuterium-ions by hydrogen-ions, etc. Spurious counts recorded under such background conditions should be subtracted from the counts in the real experiment. The fusion rate might even be zero if all 3 counts turn out to be background.

Additional details on the neutron detectors were searched for by downloading Bussard's 2006—EMC2 internal Corporation report "EMC2 Inertial-Electrostatic Fusion (IEF) Development: Final Successful Tests of WB-6; October/November 2005" from website http://en.wikipedia.org/wiki/Polywell. On pg. 24 Bussard writes the following: "The last count (or perhaps any of the 3 counts) is possibly able to be dismissed as noise . . . . The flaws in WB6 are fairly obvious: lack of cooling, tight bends on the magnet wiring, very short duration tests, with limited ability to monitor what happens, lack of diagnostics, etc." Notably, Bussard does not use the word "success" anywhere in the Summary or Conclusions sections of 2006—EMC2. Neutron background measurements are not mentioned in the report. The lack of background subtraction casts doubts on the reported testing of the WB-6 prototype.

The Future of the Bussard Fusor

Dr. Bussard's 1989 invention is still very promising. The problems described above show the difficulties of building a working model fusor. The Bussard—1989 patent was largely theoretical. It lacked practical details needed to build a working model. Scale models are expensive to build; therefore, only a few could be tested. The next prototype, WB-7, is costing the Corporation $1.75 million to build and test in 2008.

Simulating the performance of a fusor in the computer has the advantages of being fast and inexpensive compared to model construction. Bussard's main simulation program is described briefly in 2006—IAC. A more complete description is from an EMC2—1991 Corporate report: "The EKXL code . . . is a 1-D radially-dependent Poisson-solver." Because EKXL is only one-dimensional(1-D), it only applies to fusors which are perfect spheres. But the real fusor is in the shape of a cube, not a sphere. FIG. 15 of Bussard's 2006—IAC shows a graph of simulated ion-density. The density at the center of the fusor is 1000 times larger than the density at the outside edge of the fusor.

The simulations for this patent utilized a 2-D PIC program called OOPIC Pro. 2-D (i.e. 2 spatial dimensions) is required to make a realistic simulation of a cube. OOPIC Pro predicted central density equal to edge density, not 1000 times larger as reported in EKXL. This vast decrease in predicted density would result in an even larger decrease in fusor performance, other things being equal.

OOPIC Pro, from the Tech-X Corporation of Boulder, Colo. (website txcorp.com), was developed over 30 years of work by Professor Charles Birdsall and his group at the University of California, Berkeley. The technique Birdsall and co-workers used to simulate plasma physics effects was called Particle-in-cell simulation(PIC). Birdsall's simulation software has been successfully used to predict the performance of many different types of plasma devices, from vacuum tubes to tokamaks. The OOPIC-Pro software was recently updated from the Berkeley code to use object-oriented(OO) C-source language. OOPIC Pro is well-suited to run on desktop workstations, such as the 2.5 Ghz Pentium-4 by Intel.

PIC simulation techniques were also used by Bussard as described on pg. 7 of 2006—IAC: "Device and system operation and performance at startup conditions, at very early times, have been modeled by complex electrostatic computer codes that determine the coulombic interactions between all particles throughout the system and plot trajectories and densities in the system." The results of Bussard's PIC simulations were not made public, except for the brief quote just given. Bussard apparently switched to EKXL as his simulator of choice.

OOPIC Pro is fully 2-dimensional in spatial variables and 3-dimensional in velocities. It was developed entirely independently from the software used by Bussard. OOPIC Pro uses an electromagnetic field solver to solve Maxwell's equations. Both simulation codes used by Bussard solved simplified(i.e. "electrostatic") forms of Maxwell's equations. This is an inaccurate simplification for the high ion-densities needed for fusion. A 2-D "electromagnetic" solver, like in OOPIC Pro, is required to correctly include diamagnetic effects. Without diamagnetic effects, the predicted ion confinement time would be incorrect.

Use of a more realistic computer simulation has led to an improved design for a prototype over WB-7. In addition, the improved simulation points the way to the next generation prototype fusor, the steady-state fusor. WB-6 only operated for a fraction of a millisecond before it shut down and eventually melted. WB-7 is being built to run longer, but still only a fraction of a second. The reason that WB-6 and WB-7 were only designed to run for a short time is to save money. Short-pulsed operation is still costing EMC2 Corporation $1.75 million.

A practical nuclear power fusor must run continuously for days and months.

Drawbacks in the Prior Art Preventing Continuous (i.e. Steady-State) Testing

FIG. 1 shows a drawing of WB-6 copied from FIG. 12 of 2006—IAC. WB-7 is a close copy of WB-6. Both WB-6 and WB-7 were designed to run only in pulsed mode, i.e. not steady-state. Six identical electromagnets are mounted, in donut-shaped vacuum containers 100, on the six faces of a cube. The five upper magnets are supported by welded corner posts 102 from one to the next. The bottom magnet is supported by four ceramic legs 104 onto a metal plate, not shown. The metal plate(not shown) is supported by four similar legs onto the floor of a vacuum tank.

The following limitations of WB-6 are evident in FIG. 1 and from the preceding discussion:

(a) The welded assembly of the corner posts 102 make the magnets difficult to service if one needs repair. To repair a magnet requires cutting off its four welded corner posts 102 and breaking the wires they contain. Such a repair is impractical. WB-6 was abandoned as soon as a magnet winding shorted and was never repaired.

(b) The magnets' corner posts 102 are located in a crucial crossroad for flowing electrons. Electrons will hit these posts 102 and be lost. Lost electrons must be replaced as fast as they are lost. Replacing lost electrons requires increased electron input power.

(c) The magnets have no cooling lines connected to them. About one second after turning the magnet power on, the magnets will overheat. Overheating limits the maximum length of a pulsed test to one second. If the magnet power were accidentally left on, the magnets would melt.

(d) The magnets' donut-shaped vacuum containers are round when viewed in cross-section. Commercial companies sell only rectangular cross-section magnets with water cooling. Simulations for this patent show these commercial magnets will work as well as the un-cooled round ones in WB-6. Handmade magnets are expensive compared to commercially available magnets. Commercial magnets are less expensive and more reliable than hand-made ones.

(e) A 2 m diameter vacuum tank encloses a 0.3 m diameter WB-6 device. Vacuum is expensive to create and maintain. A smaller tank size, about twice the cube dimension, will work as well. Reducing the size of the vacuum tank saves money.

(f) Building a fusor around a dodecahedron would improve central density. A 1000× concentration of ions at center of a fusor was erroneously predicted by EKXL. A higher dimension polyhedron, like the soccer ball with 32 faces, would have still better central density. Each face of the polyhedron needs a separate electromagnet coil to cover it. The cube needs six; the dodecahedron would need twelve; the soccer ball, thirty-two. Interchangeable magnets are needed for mass-production, not welded into position as with WB-6.

SUMMARY

The drawbacks listed above are avoided in the first embodiment of this module. Each magnet has its own set of legs. All the magnets are identical and all the legs are identical. The legs are positioned so as not to interfere with circulation of electrons in and out of the core of a fusor.

The use of improved computer simulation has led to a fusor design with advantages over all prior fusor designs. The new design is a steady-state successor to the pulsed inertial-confinement fusors recently constructed in the prior art. Improved hardware design for a plasma energy device(fusor) is the subject of this patent.

DRAWINGS—FIGURES

FIGS. 8-8H are simulation file segments describing the operation of the first embodiment.

Figure 1:
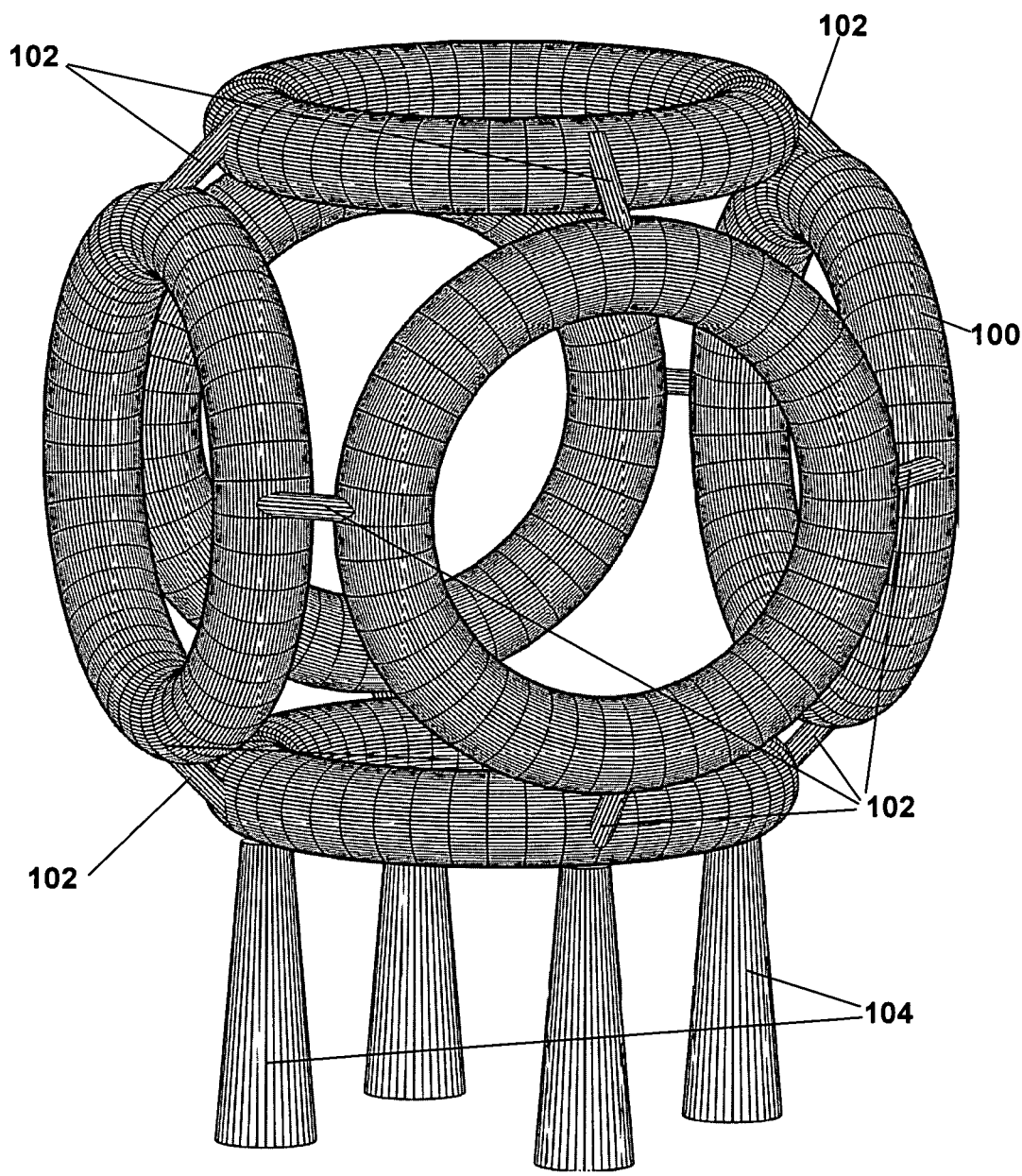
FIG. 1 is a fusion energy device (fusor) of the PRIOR ART.

DRAWINGS—REFERENCE NUMERALS 100 donut-shaped vacuum container
102 welded corner post
104 ceramic leg
200 embodiment of module
201 corner flange
203 pump flange
205 module vacuum flange 206 bolt through hole
207 vacuum tank
209 tank leg
300 first flange-leg-hole
304 second flange-leg-hole
310 third flange-leg-hole
312 fourth flange-leg-hole
314 center hole
400 spacer flange
402 butt flange
403 cylindrical tube
404 hollow leg
405 insulating section
406 fast valve
407 control wire
408 straight gas tube
409 chamfered edge
410 magnet box
411 base plate face
412 coil magnet
413 circular opening
414 electron gun
415 center line
416 flexible gas tube
417 sealed gas hole
418 gas nozzle
420 Conflat flange
422 half-nipple
424 power feed-through
430 typical ion gun
432 maximum ion current
450 corner spacing or gap
460 internal ion source
461 magnet specification
462 Inside Diameter
464 Outside Diameter
466 Thickness
500 cathode heater supply
501 heater wires
502 grid bias supply
503 grid bias wire
504 computer
505 cooling lines
506 chiller
507 fiberoptic data cable
508 computer interface
509 arc-detection cable
510 HV power supply
511 heavy-duty cable
512 magnet power supply
513 gas control wire
514 gas controller
516 AC to AC isolation transformer
518 HV power cable
520 insulated platform
522 power outlet
524 ground wire
526 thermocouple
528 trip wire
530 fast acting vacuum gauge
532 vacuum cable
600 ten-sided magnet box
700 OOPIC-Pro User's Guide
702 time step delta-t
704 Integration
706 Particle loss/gain
708 Weighting
710 Field integration
712 Force weighting
714 Monte-Carlo Collisions
720 particle coordinates
722 tank size
724 plasma electrons
725 face cusp line
726 corner cusp line
727 startup electron cloud
730 potential well
740 ions
744 dark region
746 ion density
748 beam-electron density
750 MCC-electron density
752 density scale
758 steady-state electrons
760 steady-state cusps
800 source code
802 title
806 variables block brace
807 variable np2c
808 double-slash
810 region brace
812 origin block
820 "Species" symbol
822 Species block
824 "m=" line
826 "Electron beam parameters"
828 electron energy
832 initial current
834 rise-time
836 "Electron gun parameters"
838 temperature
840 "EmitPort"
842 fourteen lines of code
844 "np2c=np2c"
846 symbol "Gap"
848 "// Top" comment
850 "name=" equation
854 "DiameterInCells" variable
856 "cellSize" variable
858 "cutCornerSide" variable
860 "Conductor" symbol
862 "C=0" equation
864 four equations
866 "time bins" equation
868 "spatial bins" equation
870 six "Segment" blocks
872 segment brace
874 manufacturer's part number
878 "magBoxWall"
880 chamfer variables
882 "magBox" segments blocks
884 equipotential block header
886 "C=" equation
888 "name=magBox" equation
890 B-field strength
891 magnet coordinates equations
892 magnetic field block
894 ions variables block
895 ion radial offset variable
896 ions' region block
897 "ecxFactor"
898 MCC region block
899 Monte-Carlo variables block
89A "Load" code 900 curve "DD"
902 "Energy"
904 curve "p+B11"

Glossary annulus donut shaped solid with circular, elliptical, or rectangular axial cross section.

B-field magnetic field=static (by electromagnets)+dynamic (by current J).

background fake neutron counts from cosmic rays or from electronics noise.

Beta ratio of plasma energy-density to magnetic energy-density (=1 when equal.)

boron-11(B11) an isotope of boron having 5 protons and 6 neutrons in the nucleus.

break-even operating point of a fusor producing just as much energy as it consumes.

chamfer diagonally cut corner on an otherwise square or rectangular shape.

confinement-time average time an ion or electron is held inside a fusor.

convergence concentration of ions at the center of a fusor caused by electric forces.

corner post welded supports holding coil magnets together at their closest points.

D+D fuel burning deuterium gas in a fusor; the simplest fuel choice.

D+T fuel burning deuterium+tritium mixture, having the largest cross section.

density number of particles per cubic meter of space.

deuterium(D) an isotope of hydrogen having one neutron and one proton.

diagnostic plot moving picture or time-history of a simulated velocity, density, etc.

diamagnetism magnetic field produced by circulating electrons, adds to static field.

EKXL code computer simulation of a theoretical fusor with spherical symmetry.

electromagnet a coil of wire with a DC current flowing in it.

electron gun emits electrons of energy/current controlled by bias/heater power.

electron volt(eV) a unit of particle energy an electron gains falling through 1 volt.

equipotential a line or curve along which the potential (i.e. voltage) is constant.

fission nuclear reaction which splits nuclei and emits energy.

fossil fuel coal and oil.

fusion nuclear reaction which combines nuclei and emits energy.

fusion conditions plasma temperature, etc. producing break-even power output.

fusion energy device fusor demonstrating a measurable amount of fusion energy.

fusor fusion energy generating device using principles of inertial-confinement.

high voltage (HV) power source of fusor input power, drives electrons into core.

hot filament source emits low-energy electrons, controlled by filament temperature.

inertial-confinement plasma fusion energy device confining ions in a potential well.

ion a nucleus of an atom stripped of most or all of its electrons.

ion source a vacuum-tight component shooting a beam of ions from a narrow orifice.

J Maxwell's equations' symbol for current density, produced by electrons and ions.

input file parameters and equations read by the computer beginning a simulation run.

light particle the lighter of the two particles in a nuclear reaction.

magnet box pressure-tight container in the shape of a chamfered annulus.

neutral gas normal gas (hydrogen, deuterium, helium, etc.) before being ionized.

neutron detection counting of neutrons to measure the rate of D+D fusion.

nuclear cross section measure of intrinsic rate of nuclear fuel burning.

nuclear fuel chemical elements which can undergo fission or fusion.

OOPIC Pro commercial PIC software with 2-D and electromagnetic capabilities.

proton(p) a bare nucleus of the lightest isotope of hydrogen.

p+B11 fuel fusor fuel producing only helium plus pure energy, no by-products.

particle-in-cell (PIC) simulation technique which tracks electrons and ions in space.

plasma gas of negatively charged electrons and positively charged ions.

potential well electric field attracting ions to a center point from all directions.

pulsed operation fusor run for approximately a millisecond (to avoid overheating).

quasi-neutral plasma with approximately equal densities of electrons and ions.

startup filling a fusor with fuel while raising the density/temperature to fusion values.

rho Maxwell's equations' symbol for charge density, electrons plus ions.

simulation computer model of a fusor, avoiding the expense of building one.

steady-state a fusor operating at constant density/temperature for extended time.

tesla(T) MKS unit of magnetic field equal to 10 kiloGauss.

tokamak fusion energy device using torus-shaped magnets to confine a plasma.

tritium(T) a radioactive isotope of hydrogen having two neutrons plus a proton.

two-dimensional(2-D) a section of an object, reduced from 3-D to ease simulation.

upscattering a scattering reaction of ion+electron which raises the ion's energy.

vacuum gauge emits a signal measuring vacuum, used to control fusor gas flow.

WiffleBall effect closing of cusp holes by diamagnetic electron currents.

WB-6, WB-7 scale model WiffleBall fusors in EMC2 Corporation of Santa Fe.

DETAILED DESCRIPTION—FIGS. 2-9

Description of the First Embodiment

Figure 2:
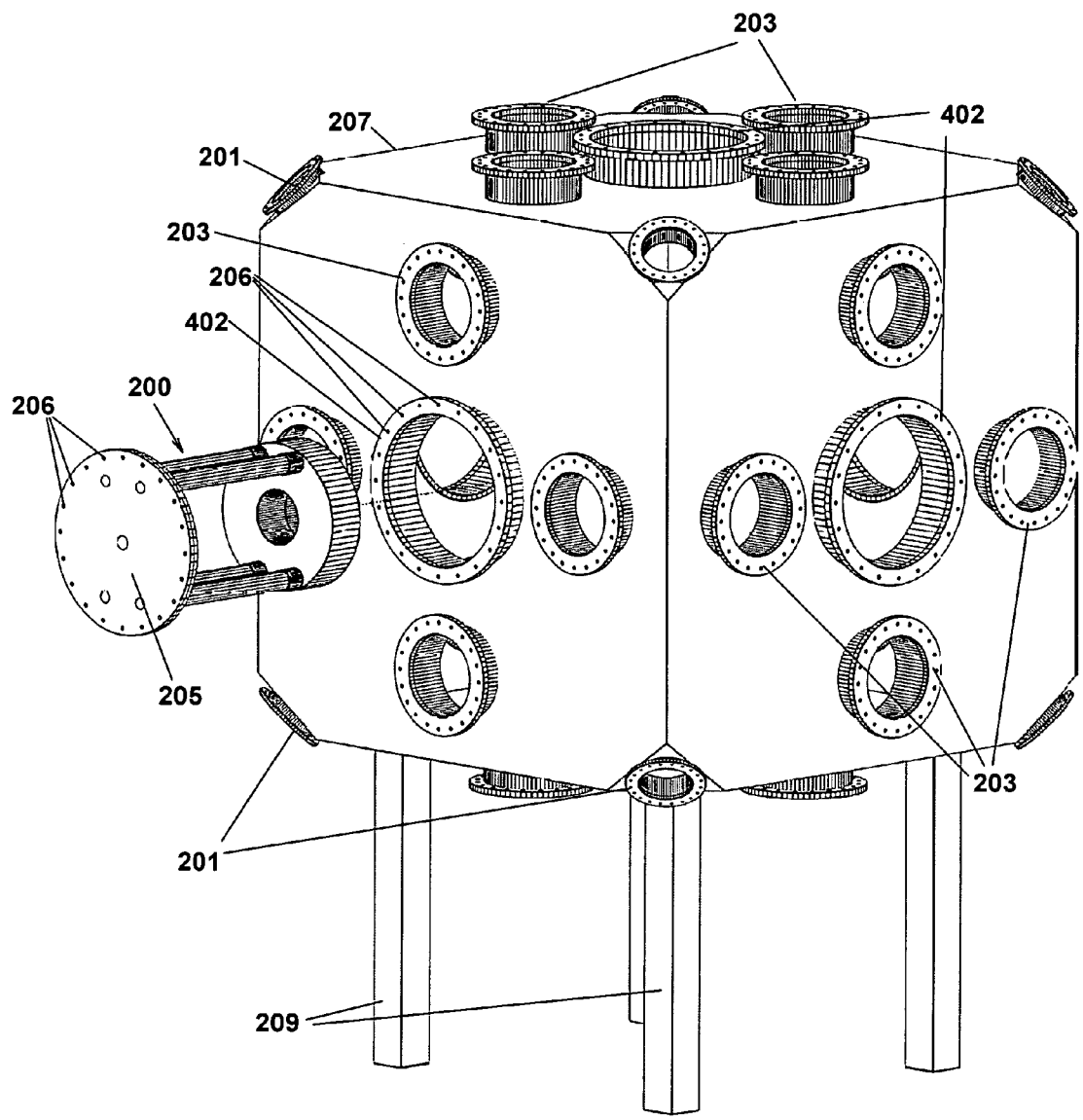
FIGS. 2-2a are assembly drawings of a fusor employing the first embodiment.

One embodiment of the module is shown in FIG. 2. The portion of the embodiment of module 200 visible in FIG. 2 is the outside of the module vacuum flange 205. Bolt through holes 206 seal the flange 205 onto a wall of a vacuum tank 207. The tank 207 is in the shape of a truncated cube, typically of dimension 1-10 m on a side, and supported on the floor by tank legs 209 of any convenient length. The flange 205 mounts to the tank 207 via bolt holes 206. Both the flange 205, the tank 207, and the legs 209 are made of nonmagnetic material, typically stainless steel or aluminum.

The walls of the vacuum tank 207 are typically 2-5 cm thick. The walls are penetrated by conveniently sized flange openings. For example, the corner flanges 201 accommodate vacuum measuring instruments and view-ports to see into the tank 207. Vacuum pump flanges 203 accommodate vacuum pumps for pumping out and maintaining the interior of the tank at vacuum.

Figure 3A:
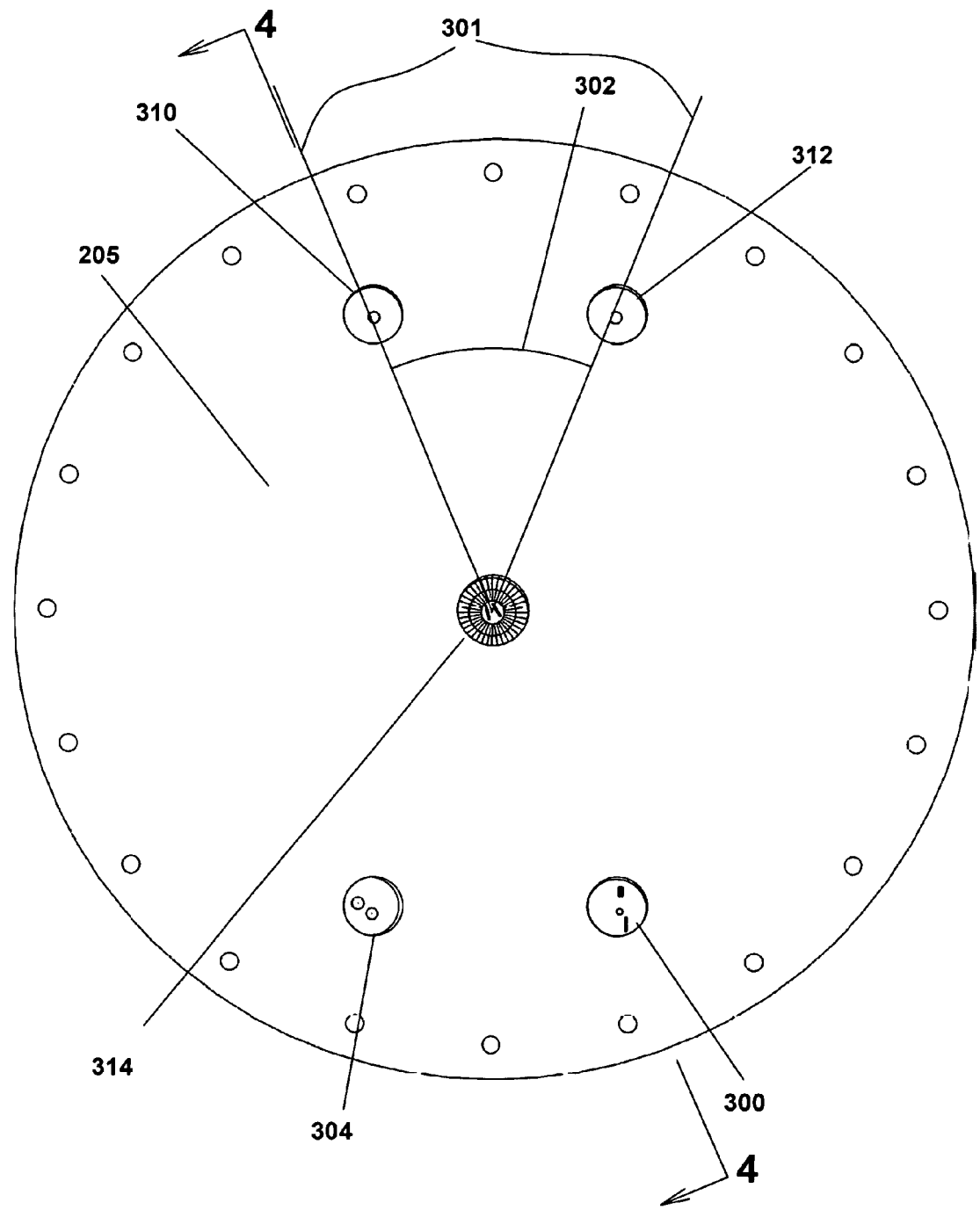
FIGS. 3a-3c are the flange of the first embodiment and two views of an alternate embodiment.

The outside of the module's flange 205 is shown in greater detail in FIG. 3a. The flange is penetrated by central hole 314 and four flange-leg-holes 300, 304, 310, and, 312. These holes carry various service wires and plumbing connections from outside the vacuum to connect to the portions of the module 200 inside the flange 205. The holes 300, 304, 310, and 312 are centered on a circular arc 302 around center hole 314, which is at the center of the flange 205. The angle of this arc 301 and the arc length 302 from hole-to-hole on this circle are chosen to align with the interior components of the module 200.

Figure 4:
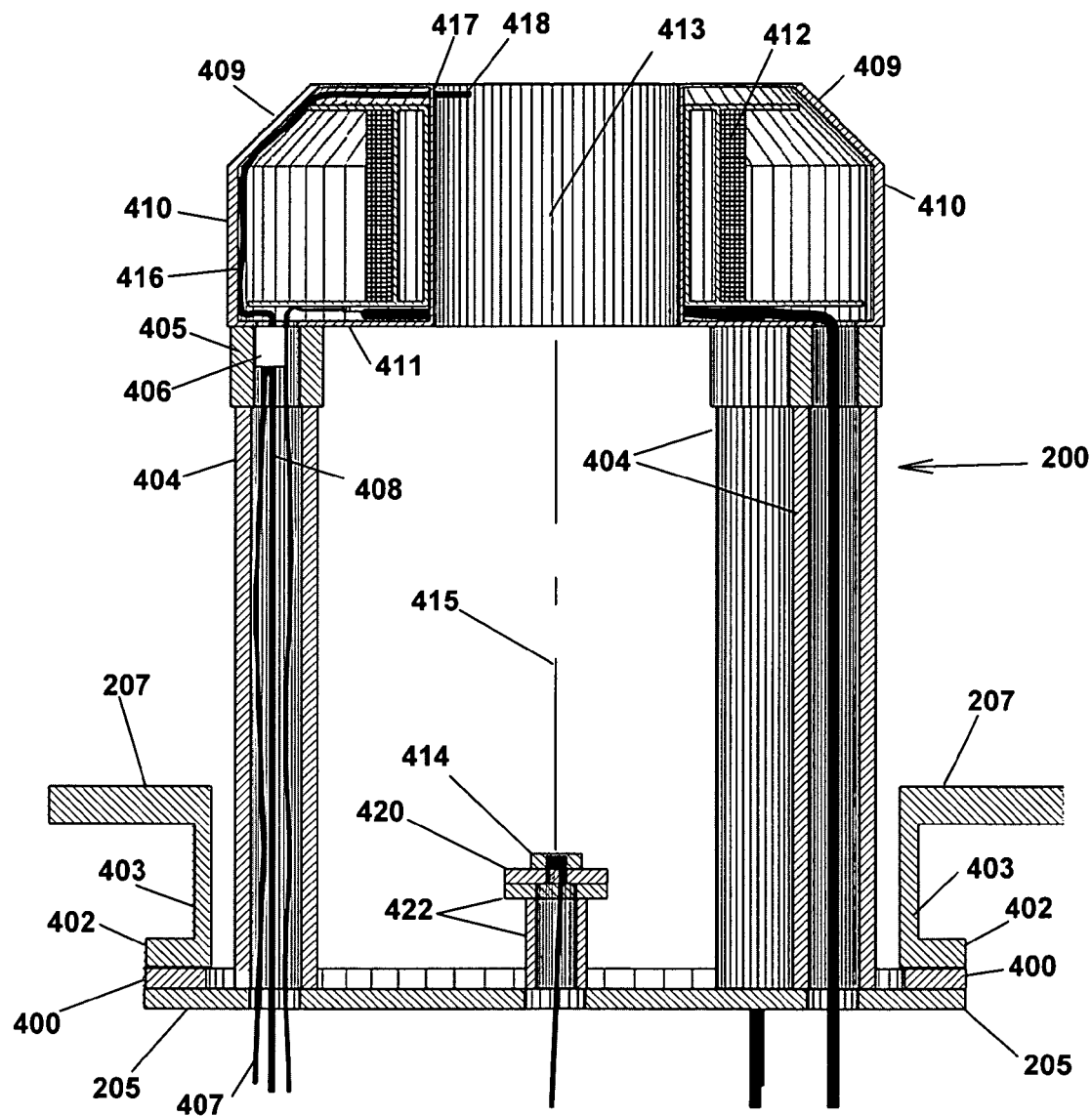
FIGS. 4-4G are a section drawing and component details of the first embodiment.
Figure 4A:
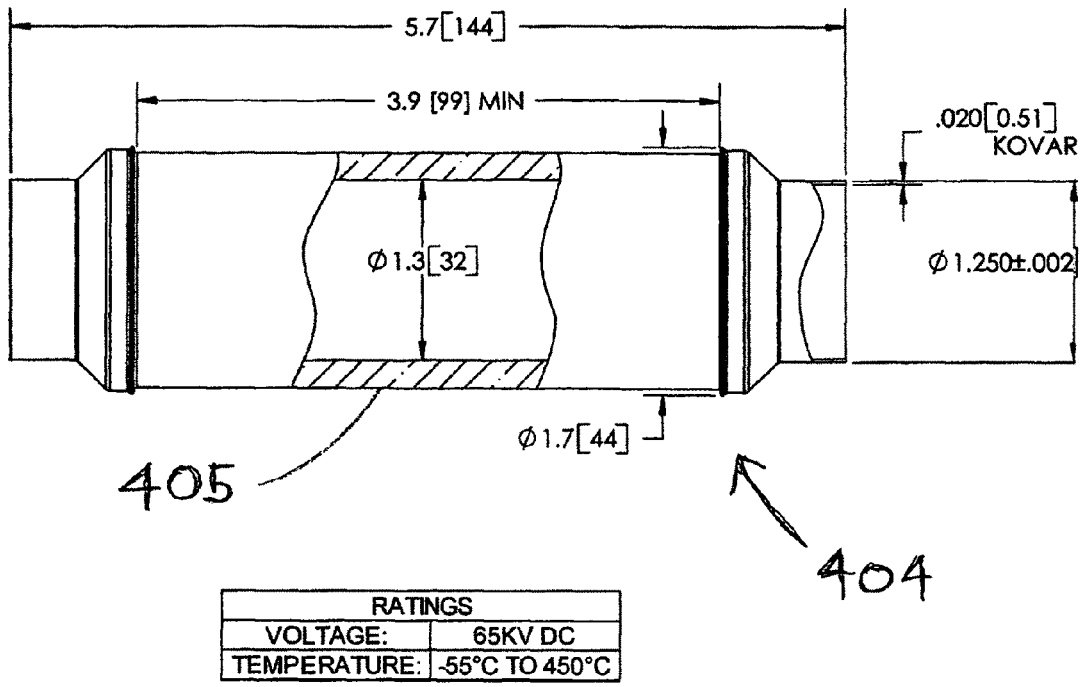

The interior components of the module 200 are shown in FIGS. 4-4G. FIG. 4 is a side view of the module 200. Flange 205 is vacuum-welded to four hollow legs 404, which mate with holes 300, 304, 310, and 312. The legs are shown in detail in FIG. 4A. Each leg contains an insulating section 405 between two conducting sections. The insulating section 405 is as long as needed to provide breakdown resistance to high-voltage specific to this embodiment, typically fifteen kilovolts. The conducting sections are vacuum welded as described in the next paragraph. The length of the legs are all the same, typically 50-200 cm. Spacer flange 400 is the same outside diameter and has the same bolt spacing as module flange 205. Butt flange 402 is the same diameter as spacer flange 400 and is vacuum welded to one end of cylindrical tube 403. Commercially available flange 402 and tube 403 are shown in FIG. 4E. The other end of cylindrical tube 403 is vacuum welded to the wall of the vacuum tank 207. The three flanges 205, 400, 402 are bolted together to be vacuum tight, using bolts inserted through bolt holes 206.

The legs 404 are vacuum welded on one end to flange 205 and on the other end to magnet box 410. Box 410 is the shape of an annulus with rectangular cross section plus one chamfered edge 409. FIG. 4 shows the box 410 in axial section through the center of the annulus. The box 410 incorporates a vacuum-welded base plate face 411, which is parallel to the flange 205. The annulus of box 410 has a circular opening 413 concentric on a center line 415 through the center of flange 205.

The interior of the box 410 is pressure tight and connected to the outside air through the hollow legs 404. Ins1ide the box 410 is a circular coil magnet 412. Commercially available magnets 412 are shown in FIG. 4C. The shape of the magnet box 410 conforms to the shape of the magnet 412 with clearance space typically 1-5 mm on all sides.

Inside one of the legs 404 is a straight gas tube 408 connected to one side of an automatic fast valve 406. A typical fast valve 406 is shown in FIG. 4B. The same leg 404 that carries the tube 408 also carries a control wire 407 from the outside of flange 205 to the valve 406. The other side of valve 406 is connected to a flexible gas tube 416, passing through a sealed gas hole 417, and ending in a gas nozzle 418. The tubes 408, 416, and nozzle 418 are typically less than 1 mm inside diameter. The flexible tube 416 runs along any convenient route inside the box 410 and outside the coil 412, in the clearance space mentioned above.

The nozzle 418 is simply a straight piece of hollow tubing of predetermined length. The length of the tubing is easily varied by trimming or replacing the nozzle 418 at the hole 417. In other embodiments the nozzle 418 might be more complicated, for example consisting of tube with a narrow orifice on the end.

Figure 4D:
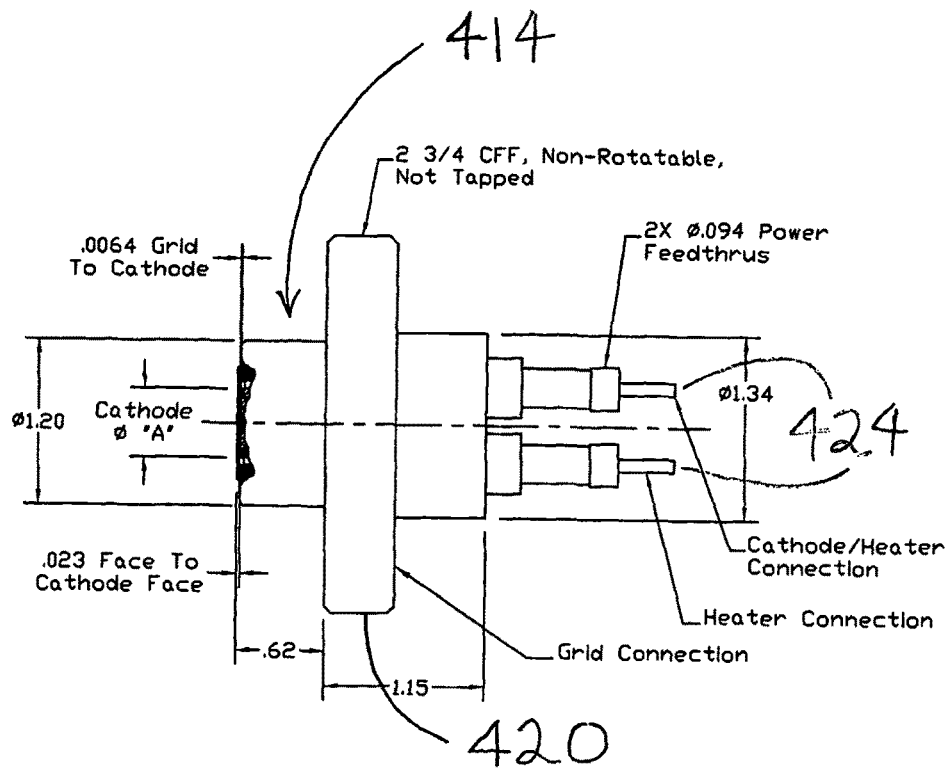

Mounted inside flange 205 and on its center line 415 is electron gun 414. Typical commercially available electron guns are shown in FIG. 4D. Electron gun 414 is mounted on a Conflat flange 420. A mating Conflat half-nipple 422 is vacuum welded at the center inside of flange 205. Conflat half-nipple 422 details are shown in FIG. 4F. The power feed-through 424 to the electron gun 414 are connected through center hole 314 to a grid bias supply 502 and cathode heater supply 500, shown in FIG. 5.

In the embodiment shown in FIG. 2-4G, six identical modules 200 are mounted on the six faces of vacuum tank 207. The legs 404 are strong enough to hold the six magnets 412 rigidly in any position, both with the legs 404 horizontal and with the legs 404 vertical. Six module flanges 205 are bolted to the six faces of the cubical shaped tank 207. In the four modules 200 mounted on the side faces of the cube, the legs 404 are horizontal and the magnets 412 are cantilevered horizontally inward from the flanges 205. In the module 200 mounted on the top of the tank 207, the magnet 412 hangs down from the flange 205 on the legs 404. In the module 200 mounted on the bottom of the tank 207, the legs 404 hold the magnet 412 up, vertically above the flange 205.

Figure 2A:
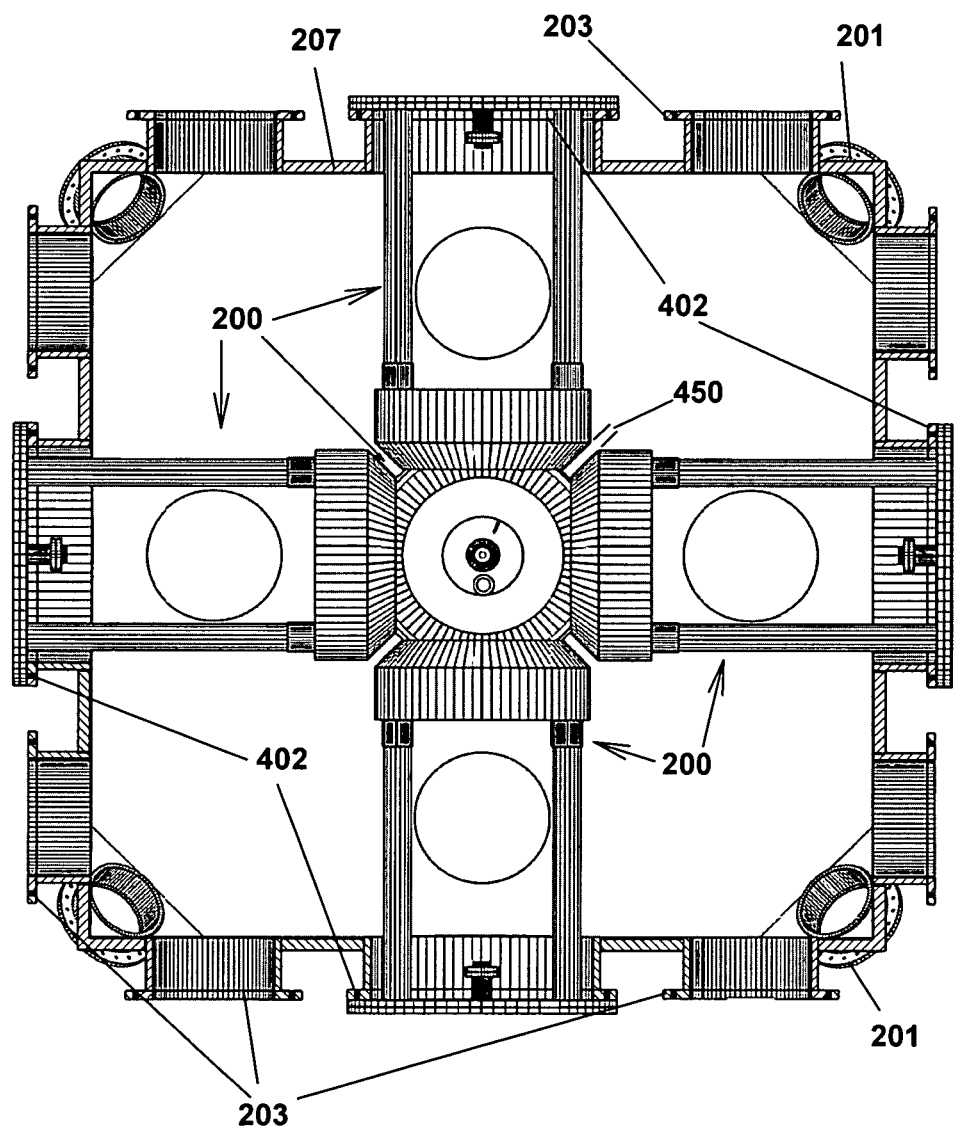

The exact spacing of the six magnet boxes inside the tank 207 is critical in obtaining the improved performance of the fusor, which is one advantage of this embodiment. FIG. 2a shows the arrangement of four of the modules 200 in a vertical (=horizontal) section through the center of the tank 207. The corner spacing or gap is the spacing of the six magnet boxes 410, at their twelve points of closest approach, one from the other. This spacing 450 is roughly set in the welding of the six butt flanges 402, which places the six magnets approximately on the faces of an imaginary cube (not shown) centered at the center of the tank 207. The fine tuning of the positions of the magnet boxes 410 is done by adjusting the thickness of the six spacer flanges 400. Choosing a thicker or thinner spacer flange 400 moves the associated magnet box 410 further outward-from or inward-to the center of the imaginary cube. By appropriate choices of the thicknesses of the six spacer flanges 400, the spacing between the adjacent chamfered edges 409 of the six magnet boxes 410 is made the same at all twelve edges of the imaginary cube. This spacing is typically 1-10 cm in this embodiment, but it may vary for other embodiments.

Figure 5:
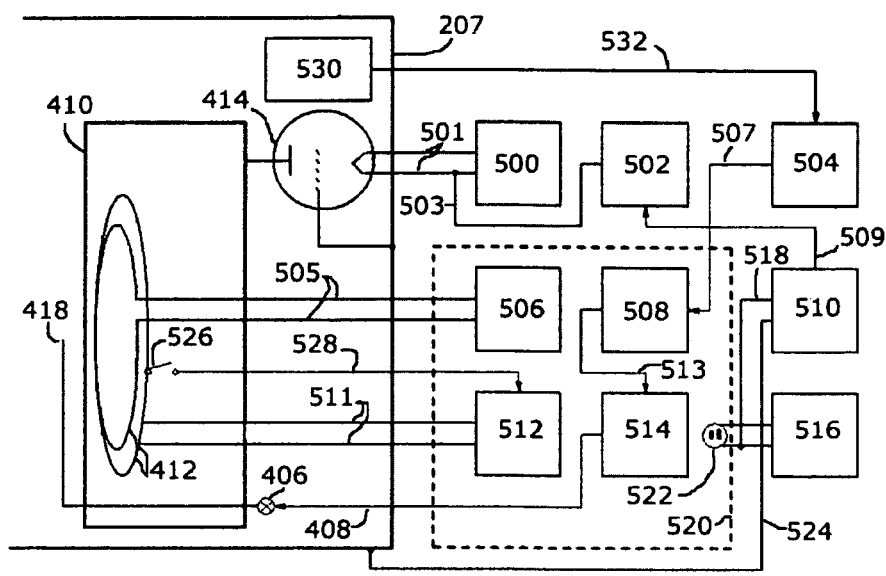
FIG. 5 is a block diagram of electrical/mechanical services to the first embodiment.

In this embodiment, plumbing and electrical services to each module 200 are the same, as shown in FIG. 5 for one of the modules 200. To the left of the wall of the vacuum tank 207 the interior parts of module 200 are shown schematically, that is not to scale. These are electron gun 414, magnet box 410, magnet coil 412, nozzle 418, fast valve 406, and straight gas tube 408. These interior components are connected through hollow legs 404 to various commercially available service devices, represented in FIG. 5 by nine square boxes.

Gas nozzle 418 is connected to gas valve 406 which is connected to tube 408. Tube 408 is connected to a gas controller 514. The controller 514 is connected by gas control wire 513 to computer interface 508. Interface 508 is connected by fiberoptic data cable 507 to computer 504. Computer 504 is also connected to a standard keyboard, mouse, and video monitor (not shown). The connection from computer 504 to valve 406 allows the valve to be opened and closed periodically. With a typical valve switching time of ⅓ millisecond, valve 406 controls deuterium gas flow into the vacuum inside the imaginary cube.

Electron gun heater feed-through 424 (FIG. 4D) are connected by heater wires 501 to cathode heater supply 500, a power supply producing approximately 8 v×12.5 A. One of the wires 501 is also connected by grid bias wire 503 to grid bias supply 502. Supply 502 has a polarity reversing feature that allows its 100 v×3 A output power to electron gun 414 to be reversed in about one millisecond which stops the electron beam.

Magnet coil 412 is connected by two heavy-duty cables 511 to magnet power supply 512. The cables are typically AWG#1 or larger, capable of supplying 40 v×100 A from supply 512 to magnet 412. Because of their diameter and heat dissipation, the two cables 511 would typically connect to the magnet 412 through two separate ones of legs 404.

Magnet coil 412 is also connected by cooling lines 505 to chiller 506. Chiller 506 circulates a liquid coolant such as ethylene glycol through the magnet coils 412. The heat carried back to the chiller 506 by the coolant is pumped into the air by a heat exchanger which is a standard feature of chiller 506. In other embodiments the heat might be transferred to an external device for converting heat to electrical power.

The magnet box 410 and valve 406 are biased to a high voltage (HV) by HV power supply 510. The HV is applied through cables 511 by raising the magnet power supply 512 to HV. Also biased to HV are chiller 506, computer interface 508, and gas controller 514. The dashed box in FIG. 5 represents an insulated platform 520 which is biased to HV along with the equipment shown inside the dashed box.

Three-phase alternating current(AC) power is provided by an AC to AC isolation transformer 516. The 240 VAC output voltage of the transformer 516 is floated by HV power cable 518 from HV supply 510 to the neutral ground of the transformer 516. The equipment on platform 520 is plugged into power outlet 522, which is a standard electrical outlet compatible with the power requirements of the equipment on the platform 520. The earth ground of the HV supply 510 is connected to the vacuum tank 207 by ground wire 524.

In this embodiment HV power supply 510 typically provides 15 kV×2 A power. However, both voltage and current capabilities can be varied in other embodiments by selecting from among commercially available HV power supplies. The supply 510 incorporates a feature to detect any sudden increase in its output current. This condition is signaled on arc-detection cable 509 which goes to grid bias supply 502. The occurrence of an accidental arc anywhere in the HV circuit turns off the electron beam in about one millisecond.

Over-temperature in the magnet 412 is sensed by thermocouple 526. The over-temperature condition is signaled on trip wire 528, causing the magnet power supply 512 to turn off.

Fast acting vacuum gauge 530 measures the vacuum pressure inside the tank 207 and sends an analog reading of the pressure on vacuum cable 532 to the computer 504. This pressure signal is analyzed in software to determine if the HV can be kept on without risk of arcing. If an arcing risk is detected in the software, the computer 504 sends a digital signal on cable 507, through interface 508, on to signal wire 513, and into gas controller 514. The gas controller responds to this signal by adjusting the gas flow using valve 406.

Operation of the First Embodiment

The operation of the above-described embodiment occurs in two steps, one after the other. The steps are controlled by a human operator at the computer 504.

The first step in operation is called startup. The air is pumped out of the vacuum tank and magnet power is set to produce a predetermined magnetic field. Then gas flows into the core of the fusor from all six directions. Six electron beams ionize the gas to make a plasma. The magnetic fields focus the electron beams toward the center of the fusor. By gradually raising the electron beams' currents, the density and temperature of the plasma is raised to fusion conditions.

After the electron beams are turned on, startup typically takes a few milliseconds.

The second phase of operation is called steady state. In steady state, the electron beams and gas flow are kept approximately constant, with minor adjustments as needed to keep the temperature and density of the plasma constant. Nuclear fusion occurs spontaneously at the center of the fusor and energy flows out continuously to the vacuum tank walls. At the tank walls the energy is converted to electrical power by conventional heat exchangers, turbines, and generators.

Steady state may last for minutes, hours, or longer. As long as gas, power, and cooling are provided, energy continues to flow out.

Validation of the Operation by Computer Simulation

Quotations were obtained from commercial suppliers of equipment shown in FIG. 5. The equipment would cost $1.1 million in 2007 dollars. Because of this high cost, I used computer modeling instead of constructing a scale model. The computer was used to validate the design and refine modes of operation.

OOPIC-Pro software was licensed from Tech-X Corporation of Boulder, Colo. FIG. 7 shows a description of the program from the Introduction of OOPIC-Pro User's Guide 700, downloaded from Tech-X's website, txcorp.com. OOPIC Pro models the performance of the fusor by tracking electrons and ions everywhere they go inside the vacuum tank 207. The tracking is performed by calculating the position and velocity of each particle at each moment in time. The particles are confined by the electric and magnetic fields inside the fusor. The fields are described by the physics principles expressed as Maxwell's Equations.

Since published 135 years ago, Maxwell's Equations have formed the basis of our understanding of electromagnetism in physics. The equations are pure and simple. The tracking of the particles in the computer is straightforward. Very few simplifying assumptions are needed to duplicate the real world in the computer. The simulation accurately predicts what will happen when a real fusor is constructed according to this embodiment.

Figure 7A:
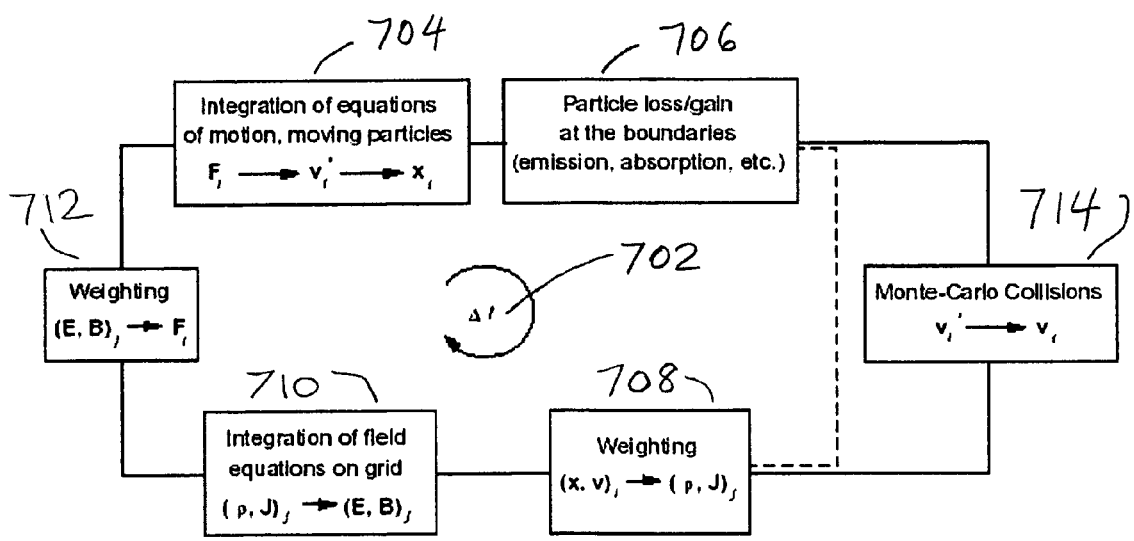
FIGS. 7-7G are software program documentation and simulated operation data.

FIG. 7A shows a flow chart of the operation of OOPIC Pro. The flow chart is adapted from one published in "Particle-in-Cell Charged-Particle Simulations" (IEEE Transactions of Plasma Science, Vol. 19, No. 2, April 1991), by Professor C. K. Birdsall of the University of California, Berkeley. For the past five decades Dr. Birdsall's group at Berkeley has developed the Particle-in-Cell(PIC) technique embodied in this computer program. In the center of the flowchart of FIG. 7A is a circle indicating the flow of simulated time. The simulation advances time by increments given by time step delta-t 702.

To specify the operation of the program, I wrote a 1240-line input source code. The full code is in a computer file named "CF1pm.txt" on CD-ROM, and incorporated herein by reference.

Compilation and execution of the source code starts with a double mouse-click on the source-file's icon on the computer screen. Then a control panel appears with buttons to "Start" and "Stop" the program. Once the "Start" button is selected, the program runs until the "Stop" button is selected. While it is running, the program displays moving pictures showing the positions of the particles, their velocities, plasma density, etc. About 45 diagnostic plots are updated in the memory of the computer. They can be displayed, printed, and/or saved to disk at the computer operator's command. While being displayed, a diagnostic plot changes as simulated time advances.

The diagnostic plots are updated at intervals delta-t 702, which is typically fifteen picoseconds. The sequence of operations named in FIG. 7A is performed for each time step. Force weighting 712 computes the force(F-sub-i) on each particle(i) from the electric field(E) and magnetic field(B). Integration 704 computes a new velocity(v-primed-sub-i) from the force(F-sub-i). Integration 704 also computes each particle's position(x-sub-i) by moving the particles at velocity(v-primed-sub-i) for time delta-t 702. Particle loss/gain 706 subtracts and/or adds particles if they are lost to walls and/or created by particle-emitters during the time step. Weighting 708 converts the new particles' positions and velocities to a new charge density(rho) and current vector(J). Rho and J are standard symbols which occur in, and are governed by, Maxwell's equations. Field integration 710 converts rho and J into new electric and magnetic fields, E and B, using Maxwell's equations. These operations 712, 704, 706, 708, 710 are repeated over and over until the program is manually stopped. When stopped, the accumulated time is typically about ten microseconds.

Monte-Carlo Collisions 714 is an optional step executed between 706 and 708 if the source code specifies it. Monte-Carlo is a computing technique used to simulate the random quantum processes that happen when an electron hits a gas atom. One process or another can occur by chance. Each process is more or less likely depending on quantum probabilities. In the collisions 714 box, probabilities are computed for each process, such as ionization, scattering, capture, etc. Each time a collision occurs, one of these processes is randomly selected according to its probability. Ionization is the most important of these processes. When it occurs, it produces an ion-plus-electron pair of particles. These ion-electron pairs form the plasma, starting with the gas injected from gas nozzle 418.

Simulating Startup of a Fusor Incorporating this Embodiment

Figure 7B:
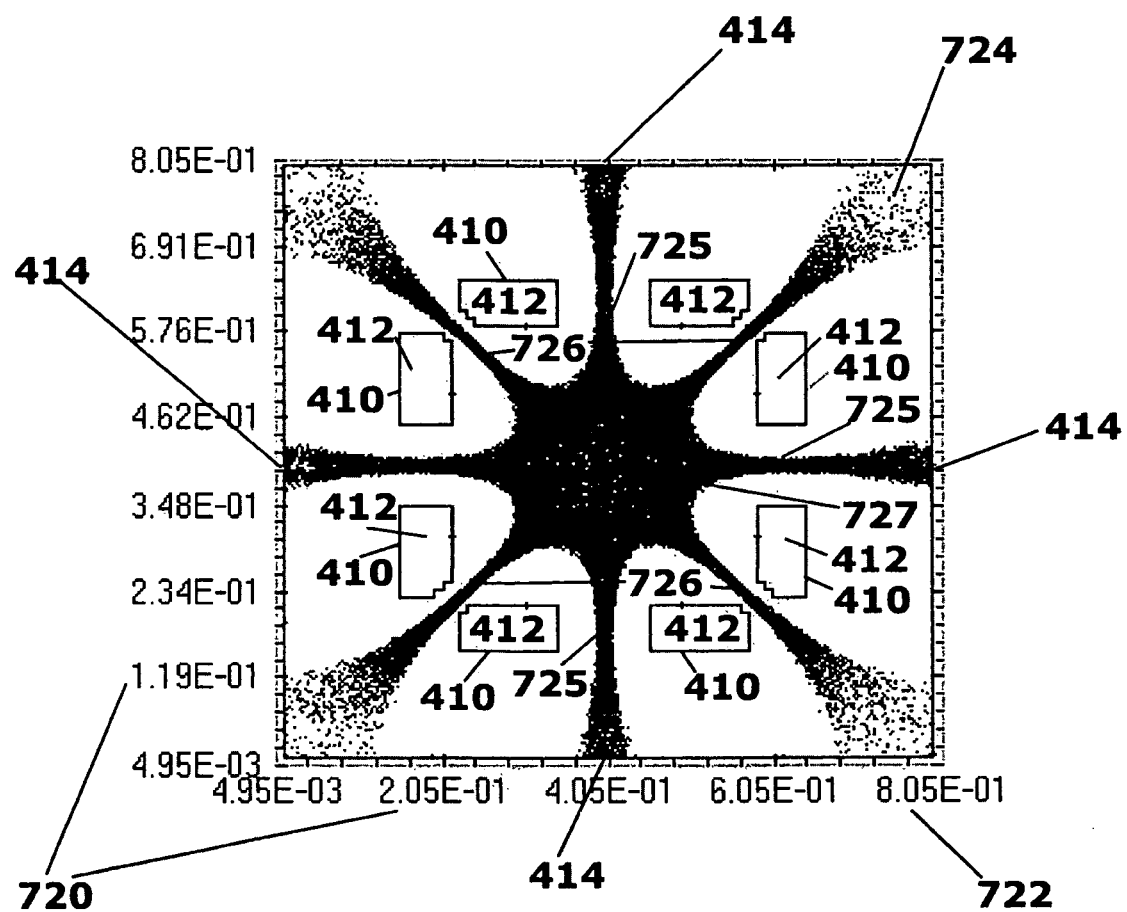

Startup starts with an empty vacuum tank. The tank fills gradually with plasma formed by electrons from simulated electron guns and by ions from simulated ion sources. FIG. 7B shows a diagnostic plot saved after ten microseconds of simulated operation. Particle coordinates 720 indicate position in meters along the edges of the vacuum tank 207. The units used in all OOPIC-Pro diagnostic plots are scientific MKS, that is meters, kilograms, and seconds. Thus "8.05E−01" at the end of the horizontal axis, the tank size 722, means 80.5 cm. Tank size 722 is specified in the source code as the edge dimension of the vacuum tank 207. FIG. 7B shows electrons in a horizontal section through the center of cubic vacuum tank 207. The 80.5cm value of tank size 722 was selected big enough to leave clear space inside the tank and outside the square formed by the placement of magnet boxes 410. The sizes of the magnets 412 was selected from among the commercially available sizes shown in FIG. 4C.

Plasma electrons 724 are represented by black dots in FIG. 7B. The density of the dots indicates the density of electrons, more dense at the center and less dense at the outside. Electrons are emitted by electron guns 414 at the four positions labeled "414" in FIG. 7B. The magnet boxes 410 are biased to voltage fifteen kilovolts. Voltage creates an electric field which pulls the electrons from the electron guns 414 through the four openings 413 in the magnet boxes 410. Electrons are trapped inside the magnets 412 by the magnetic field. The magnetic field is not shown in this figure but was viewed in another diagnostic plot to be as follows: The magnetic field is stronger near the magnets and weaker toward the center. The magnetic field lines squeeze close together along the four face cusp lines 725 and four corner cusp lines 726 where the electron density is the highest. The trapped electrons circulate in and out of the central region along these magnetic field lines. This circulation is apparent as motion of the dots representing the electrons 724 in the online display of the diagnostic of which FIG. 7B is a snapshot. FIG. 7B was saved from the computer screen at ten microseconds into the simulation.

Efficient electron circulation is an advantage of this embodiment. As seen in FIG. 7B, electrons do not hit the magnets. This is in contrast to the prior art, in which WB-6 and WB-7 incorporate corner posts 102 supporting the magnets. Posts 102 block the corner cusps' lines, preventing electrons from circulating. The present embodiment saves the circulating electrons from hitting the corner posts 102, which saves input power. The commercial cost of the HV power supply 510 is about $1 per watt of output power. Inefficient electron circulation can consume megawatts of power during startup, as was the case with WB-6. To provide such power steady-state would consume millions of dollars in the power supply 510.

Figure 7C:
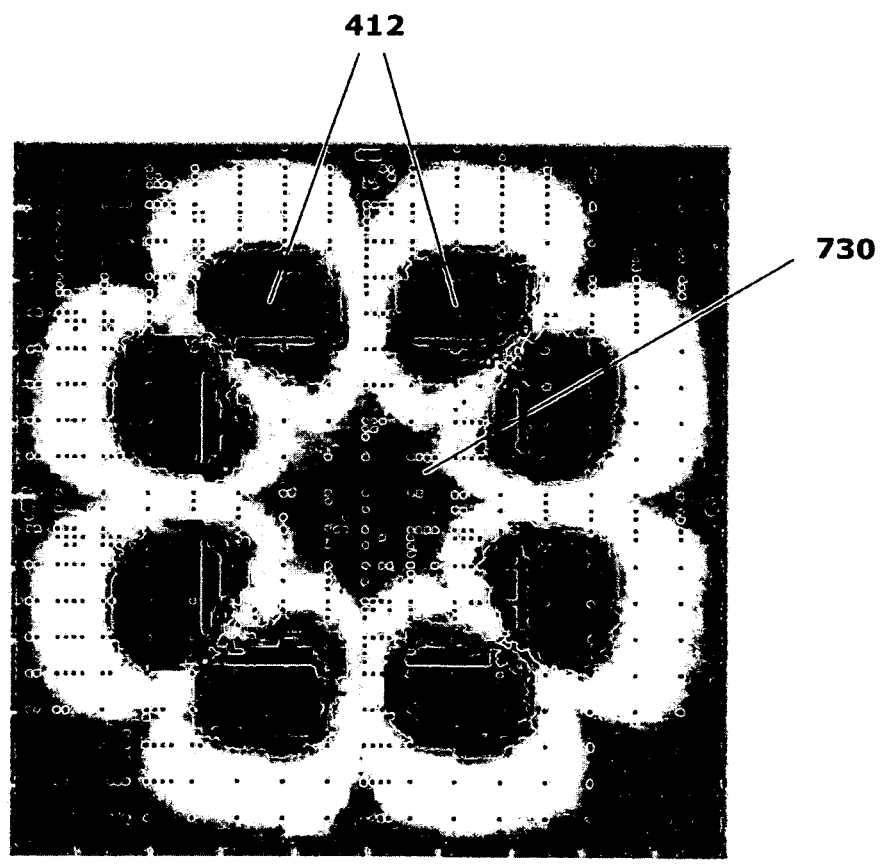
Figure 7D:
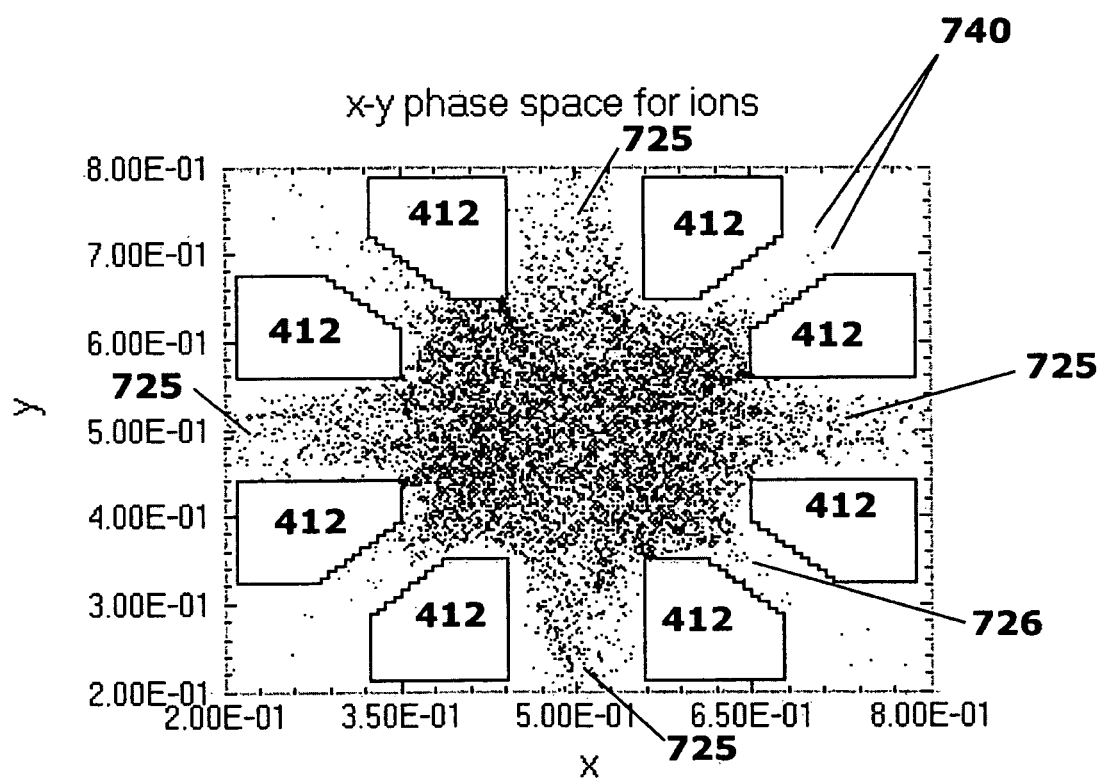

FIG. 7C shows a snapshot of the electric potential function from the computer screen, again at ten microseconds simulation time. The electrons form a potential well 730 which traps ions inside the magnets 412. FIG. 7D shows ions 740 as black dots. Where the dots are close together, that is inside the magnets 412, the ion density is high. A few of the ions leak out of the potential well along the face cusp lines 725 and along the corner cusp lines 726. Unlike the electrons, ions do not circulate. Ions are positively charged; thus, they accelerate in the opposite direction from (negative) electrons. The electrons accelerate into the core of the fusor. The ions accelerate out of it, driven by the electric field between the magnet boxes 410 and the tank wall 207. Every ion that escapes the potential well 730 accelerates to the tank wall 207 and is lost at its maximum energy. It takes much more energy to replace a lost ion than to replace a lost electron. This is because the electrons are moving slowly when they are lost. In contrast, the ions are moving fast when they are lost.

The above statement, "It takes much more energy to replace a lost ion than to replace a lost electron", is not true of the prior art. Electrons lost on the corner posts 102 are lost with maximum energy. These electrons are just as expensive to replace as ions lost on the tank walls 207. This disadvantage of the prior art is revealed here for the first time by this simulation.

The validation of this embodiment, as well as the testing of the prior art, used a cubical magnet arrangement. Other embodiments, described below, use polyhedra of higher order, such as a dodecahedron. Higher order polyhedra have section shapes that are more nearly circular than the square section of a cube. The dodecahedron (etc.) would produce a more nearly circular potential well. A more nearly circular well would leak fewer ions and therefore conserve power in startup. Other embodiments of this invention will thus have additional advantages over the prior art, as described below in the section "Other Embodiments of this Invention".

OOPIC Pro computes the potential well 730, shown in FIG. 7C, from the particle densities using Maxwell's equations. Physics principles tell us that the force on each ion is proportional to the strength of the potential at the position of the ion. The potential well 730 has the same shape as the outer surface of the startup electron cloud 727 of in FIG. 7B. The non-circular shape was unknown in the prior art. Prior art's simulation predicted a circular potential well. The improved simulation gives us this new information about the general functioning of both prior art and present embodiment. The present embodiment is designed to accommodates the new information. The prior art was unaware that a problem exists.

The problem caused by the non-circular shape of the potential can be seen in FIG. 7D. When an ion tries to escape it bounces back from the potential well 730. If the potential well 730 were circular, as the prior art claimed, the ions would reflect toward the center point and converge there from all directions. If the prior art were correct, a dense concentrating of ions would be observed at the center of the square formed by the magnets 412.

My more accurate simulation shows the potential well 730 to have a cusped shape, far from circular. Different ions reflect back at different angles from the edge of the well. The typical ion does not bounce back toward center, but rather bounces at some random angle depending on where it happened to hit the edge of the potential well 730. Every different ion bounces at a different angle and even the same ion bounces at different angles on each trip it makes back and forth across the potential well 730.

My simulation predicts a complete lack of central convergence for the ions. The present embodiment provides advantages to overcome this heretofore unforeseen defect in all fusors constructed after Bussard 1989. Break-even operation can be approached either by increasing the power out or decreasing the power into the fusor. The simulation disclosed a defect in central density causing a reduction in expected fusion power out. In this embodiment, a corresponding decrease in power-input helps restore break-even operation.

The Structure of the Input File Used to Simulate Startup

Changing the operating parameters from startup to steady state requires editing the input file for OOPIC Pro. FIG. 8 shows the first page of the source code 800 that must be changed. The code 800 has a title 802 followed by three sections between braces. The first section is delimited by Description block braces 804. The 2nd section is a Variables block, starting with variables block brace 806. "Variables" are user-invented terms which associate useful numbers with memorable names. Outside the Description block braces, one-line comments are delimited by double-slash 808. Comments give explanations for human readers but are ignored by the OOPIC-Pro compiler.

FIG. 8A shows the beginning of the 3rd and final section of source code 800. The Region block begins with region brace 810. OOPIC Pro defines two types of constructs for use in the Region block. "Species" symbol 820 is an example of a block header symbol. "Species" introduces Species block 822. Inside Species block 822 are examples of the other type of OOPIC-Pro defined symbols. These symbols are all those used on the left-hand side of equations. For example, the "m=" line 824 defines the mass of the electron in MKS units. Symbols defined by the OOPIC-Pro compiler language must be spelled exactly as described in the OOPIC-Pro User's Guide 700. On the right-hand side of equations there are expressions made up of variables defined in the Variables section. For example, origin block 812 contains the definitions of frequently used variables "x1origin" and "x2origin". "x1origin" is the center of the vacuum tank 207 in the horizontal(x) direction. "x2origin" is the center in the vertical(y) direction. Expressions in the Region block combine variables using arithmetic operators borrowed from the traditional C computer language.

FIGS. 8B-8F show five code segments describing the five hardware components: electron gun 414, vacuum tank 207, magnet boxes 410, magnets 412, and gas nozzle 418.

FIG. 8B shows segments of code 800 defining the electron gun 414. The electrical parameters of the electron beams are defined in the 8-line Variables code segment beginning with comment "Electron beam parameters" 826. These parameters include the initial electron energy 828 and final electron energy 830, both in units of electron-volts(eV). The electrons' beam currents vary in time as specified by an initial current 832 in amps and rise-time 834 in seconds. The block of code headed by the comment "Electron gun parameters" 836 is comprised of Variables defining the physical dimensions and temperature of the electron guns 414. The temperature 838 is temporarily set to zero degrees Kelvin, a valid approximation for simulating this embodiment.

The code segment starting with "EmitPort" 840 is from the Region block of the complete code 800. These fourteen lines of code 842 following "EmitPort" 840 are equations having an OOPIC-Pro defined symbol on the left-hand side of the equals sign and an expression of my creation on the right-hand side. The meaning of the symbols on the left-hand side are in the OOPIC-Pro User's Guide 700, available on the txcorp.com website. One important equation is "np2c=np2c" 844. On the left-hand side is an OOPIC-Pro defined symbol. On the right-hand side is variable np2c 807 from FIG. 8. The numeric value of variable np2c 807 is 2E8 (that is 200 million). This defines the number of real electrons represented by each dot of plasma electrons 724 in the diagnostic plot of electron positions FIG. 7B. The value of variable np2c 807 is occasionally made larger or smaller to make a particular simulation run faster on the computer or to produce improved statistics in the diagnostic plots, respectively.

The next code block in FIG. 8B is headed by OOPIC-Pro defined symbol "Gap" 846. The brace-delimited block of code following "Gap" 846 defines the voltage on the electron guns 414 to equal zero. The high voltage(HV) across the gap between electron guns 412 and magnet boxes 410 is relative to this (zero) voltage on the electron guns 414, as described more in FIG. 8C to follow.

The blocks of code "EmitPort" 840 and "Gap" 846 are repeated 3 more times. Only the first 3 lines of this additional code are shown in FIG. 8B following "//Top" comment 848 at the bottom of FIG. 8B. Four electron guns 414 shoot in electrons from the four walls of the tank 207. Each electron gun is specified by a separate block of code similar to that just described. The additional three blocks of code describing the other electron guns differ in minor ways, such as the "name=" equation 850 and other equations giving different physical positions and directions of the beams. The code for the additional blocks, not shown, can be simply derived from the one shown.

FIG. 8C shows a segment of code 800 specifying the vacuum tank 207. The tank 207 has a square cross section. The edge dimension of this square is defined by the "DiameterInCells" variable 854. The "cellSize" variable 856 multiplies variable 854 to compute the dimension of the tank 207 in meters. "cellSize" variable 856 effects the execution speed of the simulation. PIC technique uses this variable 856 to convert all supplied dimensions to integers inside the computer. In the code 800 the user may choose to use either integers or floating point numbers, whichever is convenient. Floating point numbers are convenient for specifying dimensions of most structures to be simulated. A few critical components, like the vacuum tank 207, are specified as integers in the code 800 to be sure that round-off errors do not occur from floating to integer conversion inside the computer.

The "cellSize" variable 856 effects execution speed in the following way: each of the E-field and B-field values, shown in boxes 704-712 of FIG. 7A, are computed at intervals of "cellSize" across the diameter of tank 207 at each time step delta-t 702. The total number of calculations of these fields in each time step is the square of "DiameterInCells" or 1600 in the case of variable 856. The smaller the "cellSize" is, the slower the simulation runs. Small values of "cellSize" are needed occasionally to improve the smoothness of representing diagonal lines such as the chamfered edge 409.

The tank 207 may be specified with a diagonal corner cut setting "cutCornerSide" variable 858 nonzero. This feature of the code 800 is not needed and was disabled in this embodiment by setting variable 858 to zero. The "Conductor" symbol 860 specifies a metal-type of material defined in the OOPIC-Pro User's Guide 700. The "C=0" equation 862 sets the voltage on the tank 207 to be zero, that is electrical ground. The four equations 864 define two diagnostic plots, named "tankWall" in the simulation. One diagnostic accumulates a count of how many electrons and ions hit the tank 207 as a function of time. The "time bins" equation 866 specifies a time interval of 10 ns for accumulating this time function. Another diagnostic accumulates the distribution of particles in position along the first "Segment" of tank 207, described in the next paragraph. The "spatial bins" equation 868 specifies that ten bins span the length of this "Segment" for accumulation of the spatial distribution.

The six "Segment" blocks 870 define the right wall of tank 207. The first segment of the right wall is defined starting at segment brace 872. Four equations following brace 872 give the horizontal(x) and vertical(y) coordinates of the beginning and end of a line segment in the two-dimensional space simulated. This first segment goes from the lower-right corner of the tank 207 to the edge of the half-nipple 422 which mounts the electron gun 414 at the center of the right tank wall. The remaining five of the six blocks 870 define the remaining segments of the right tank wall. The end coordinates of each segment join the beginning coordinates of the next, so that the combined effect of the six segments 870 is to specify the entire right wall, including an indent for the half-nipple 422 and electron gun 414 mounted at the center of the right wall.

The other three walls of tank 207 are defined in three blocks similar to blocks 870. The code for these additional blocks, not shown, can be simply derived from the one shown.

FIG. 8D shows a segment of code 800 specifying the magnet boxes 410. The manufacturer's part number 874 is printed at the head of a column of magnet specification 461 in FIG. 4C. In the column headed by specification 461 are Inside Diameter 462, Outside Diameter 464, and Thickness 466 dimensions describing that particular magnet. These three dimensions from FIG. 4C were converted to meters and copied to magnet variables 876 as "magID", "magOD", and "magHeight", respectively. The magnet boxes 410 are designed to conform to the manufacturer's size in specification 461, but with two additional modifications to accommodate features of this embodiment. "magBoxWall" 878 is a dimension specifying clearance space outside magnets 412 and inside magnet boxes 410 to optionally circulate cooling air between the magnets 412 and the magnet boxes 410. In this embodiment, the clearance is minimized, that is set to equal zero. Non-zero "magBoxWall" 878 may be advantageous in other embodiments.

Chamfer variables 880 set the size of the clearance between the almost-touching corners of the six magnet boxes 410 which make up a cube in this embodiment. In the real world, this corner spacing 450 is adjusted by the thickness of the spacer flange 400 and length of legs 404. In the simulation, the clearance is adjusted by the chamfer variables 880, namely "magCornerGap", "magChamferIn", and "magChamferOut". The actual size of the clearance is the same in the simulation as it would be in the real world, even though specified differently. Gravity is not simulated; there are no legs or flanges in the simulation.

The "magBox" segments blocks 882 specify the positions of five line segments which delimit the outline of the first of the eight cross sections of magnet boxes 410 in the plane of the simulation. Each segment has four rectangular sides plus one diagonal side simulating the chamfer. The remaining seven cross sections are specified in Segment blocks similar to blocks 882. The code for these additional blocks, not shown, can be simply derived from the blocks 882.

The equipotential block header 884 defines the electrical properties of the magnet boxes 412. All eight boxes are held at the same high voltage(HV). The equipotential "C=" equation 886 sets this HV to be equal to the electron energy 830 defined in the Variables block of code 800. Impressing voltage HV on the magnet boxes 412 provides a static E-field which accelerates electrons from the electron guns 414, through the openings 413 in the magnets 410, and into the cubical core of this embodiment. In the simulation of this embodiment, the HV is fifteen kilovolts.

The four lines of code following equation 886 define diagnostics plots tracking the time sequence and spatial distribution of particles which hit the magnet boxes 410. These four lines refer to the segments following them in the same way as four equations 864 referred to the segments of the vacuum tank 207. The "name=magBox" equation 888 distinguishes these diagnostics tracking losses on the magnet boxes 410 from losses on the tank 207.

FIG. 8E shows a segment of code 800 specifying the magnets 412. The B-field strength 890 is a variable defining the strength of the magnetic field at the center of each one of the magnets 412. All four magnets in the simulation have the same field strength given by strength 890, measured in kiloGauss. One kiloGauss equals 0.1 Tesla(T) in MKS. "magCurrent" in the equation following strength 890 is the current in amperes to produce the strength 890. This comes from the manufacturer's specification 461 relating B-field to current.

Magnet coordinates equations 891 define Variables Xi and Yi (i=1, 2, ... 8), the coordinates of the centers of each of eight cross sections of the magnet boxes 410. These equations describe the simple geometry of the square layout of this embodiment, taking into account the size and spacing of the magnet boxes 410.

The two equations in magnetic field block 892 are lengthy expressions for the horizontal component, B01analytic, and the vertical component, B02analytic, of static magnetic field produced by the four magnets 412. These two equations require some more detailed explanation. Although there are only four magnets 412 in the simulation, each magnet 412 intersects the median plane of the tank 207 at two places. Four magnets 412 therefore produce eight terms in each of the two equations in block 892. Each of the eight terms expresses the field from an imaginary, thin, straight wire carrying a current given by "magCurrent", defined following strength 890. The magnetic field from a wire is known from college physics textbook "Classical Electromagnetism", 1975, by J. D. Jackson. Adding the eight contributions from eight wires is justified by the principle of superposition of fields, also explained in Jackson—1975.

The real magnets 412 shown in FIG. 4C have 460-turns of wire wound in a circle to make a coil, not just one wire as in the simulation. The simulation results in FIG. 7B show that the electrons do not circulate close to the magnet boxes 412. The difference between a single wire and the many wires of the real magnets is only important at short distance. There are no electrons at short distances; therefore, the approximation to a single wire in each of the eight magnet boxes 410 is accurate.

The fusor of this embodiment also has modules 200 mounted on the top and bottom faces of the cubic tank 207. The top and bottom magnets 412 of these top and bottom modules 200 are omitted from this simulation. Omitting them is justified because parts of the four side coils are also omitted by the approximation of representing each side coil as two straight wires. The fields from the omitted parts of the four side coils just cancel the fields from the omitted top and bottom coils. These two approximations, though not accurate if taken one at a time, add up to an accurate approximation when taken together.

The "B01analytic" and "B02analytic" equations in block 892 contain special lower case symbols x1,x2 893 which are unrelated to uppercase X1 and X2 defined in equations 891. Lowercase symbols x1,x2 are evaluated by OOPIC Pro for each of 80×80 cells in the simulation. Because the magnets 412 do not change during the simulation, the magnetic fields defined in block 892 are static in time. These static fields from the magnets 412 are added to the dynamic fields that come from Maxwell's equations at each cycle around the delta-t 702 loop in FIG. 7A.

FIGS. 8F and 8G show alternate segments of code 800 specifying an ion source. These two figures define two different hardware devices for filling in ions into this embodiment. FIG. 8F simulates ion guns and FIG. 8G simulates neutral gas ionization. Ion guns were simulated to produce the diagnostic plots discussed above in reference to FIGS. 7B-7D. However, ion guns are slower to produce ions than is gas ionization. Ion guns are convenient to simulate early times in startup, but not to simulate steady state. To speed the transition from startup to steady state, gas ionization is the preferred device. Gas ionization raises the plasma density to fusion levels in a shorter amount of real time than ion guns can. Both devices for supplying ions were simulated in separate runs of OOPIC Pro. The simulations revealed the advantages and disadvantages just discussed.

FIG. 4G shows a typical ion gun 430 available from a commercial supplier.

FIG. 8F describes a simulated ion gun in ions variables block 894. These Variables 894 are analogous to the definitions of electron guns 414 in code lines referenced 826-836 of FIG. 8B. The main difference is the ion radial offset variable 895 which specifies the position of eight ion guns. Ions guns are offset by this amount from the inside surfaces of the eight magnet boxes 410. The ions' region block 896 contains code similar to code in lines referenced 840-850 in FIG. 8B. After block 896 in code 800 are seven similar blocks (not shown) specifying positions of the other seven ion guns, for a total of eight.

The ion guns described in FIG. 8F produced the simulated ion density shown in FIG. 7D. The density of ions shown in FIG. 7D is too low to produce fusion. The ion gun specified in FIG. 4G can produce a maximum ion current 432 of only 100 nA. This is too small to supply enough ions for steady-state operation of this embodiment. A more powerful source of ions is required to demonstrate steady-state operation. Neutral gas ionization can produce ions faster than ion guns.

FIG. 8G shows the segment of code 800 alternatively specifying the gas nozzle 418 by neutral gas ionization. Neutral gas ionization is simulated in OOPIC Pro by the Monte-Carlo Collisions 714 box in FIG. 7A. Monte-Carlo variables block 899 contains equations defining dimension, pressure, temperature, and density of a simulated rectangular region of gas. "ecxFactor" 897 is an equation defining an electron collision cross-section multiplying factor. By setting this to a large number, one hundred in this case, the simulated ionization occurs with increased probability. Increased probability makes the ion density rise faster in simulation than it would in real startup. This saves on computer time.

Monte-Carlo Collisions MCC region block 898 contains equations transferring the gas description variables from Variables block 899 to predefined MCC symbols. The selected variables in block 899 specify that the gas fills a square region centered inside the square formed by the eight magnet boxes 410. The gas is ionized by four electron beams impinging in four directions from electron guns 414.

Figure 7E:
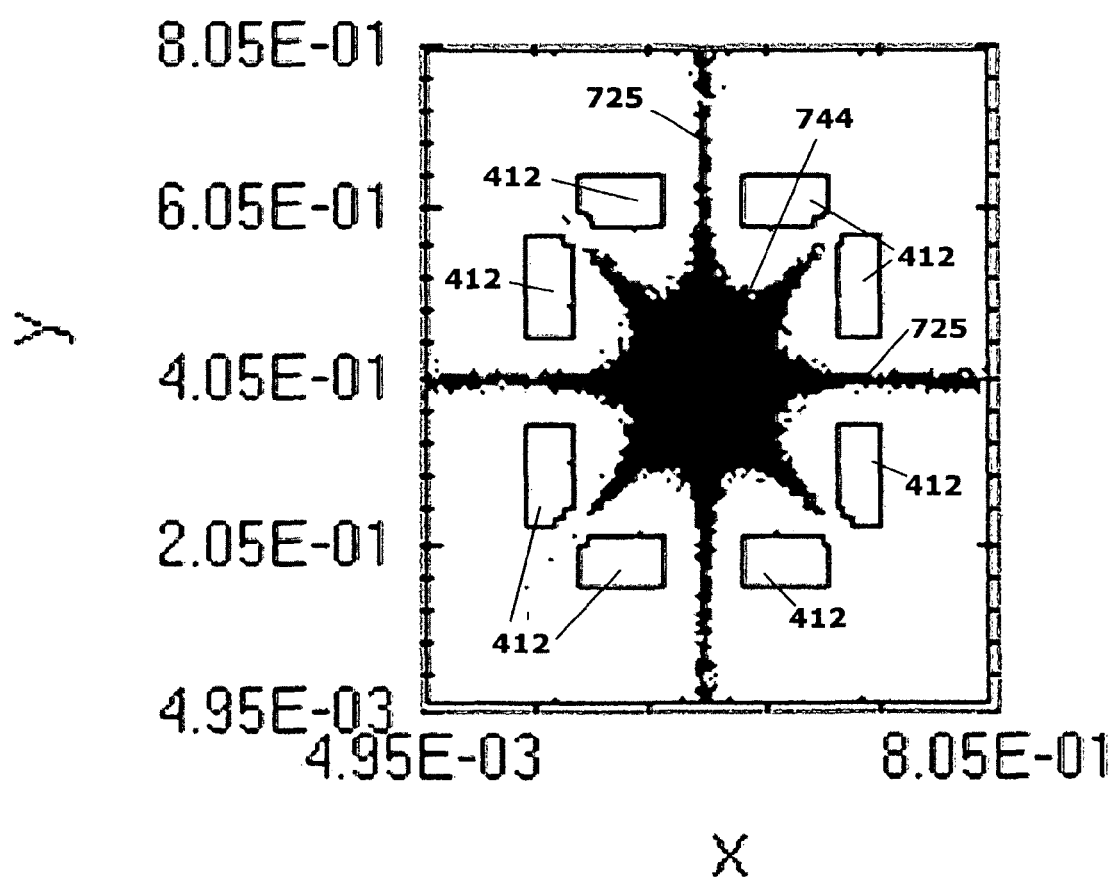

FIG. 7E shows a snapshot of ion density from OOPIC Pro simulating the ion distribution. The dark region 744 shows ions' positions after 58-microseconds of simulated time. The ions are confined inside the square formed by the eight magnets 412, except for some leakage along the face cusp lines 725.

Figure 7F:
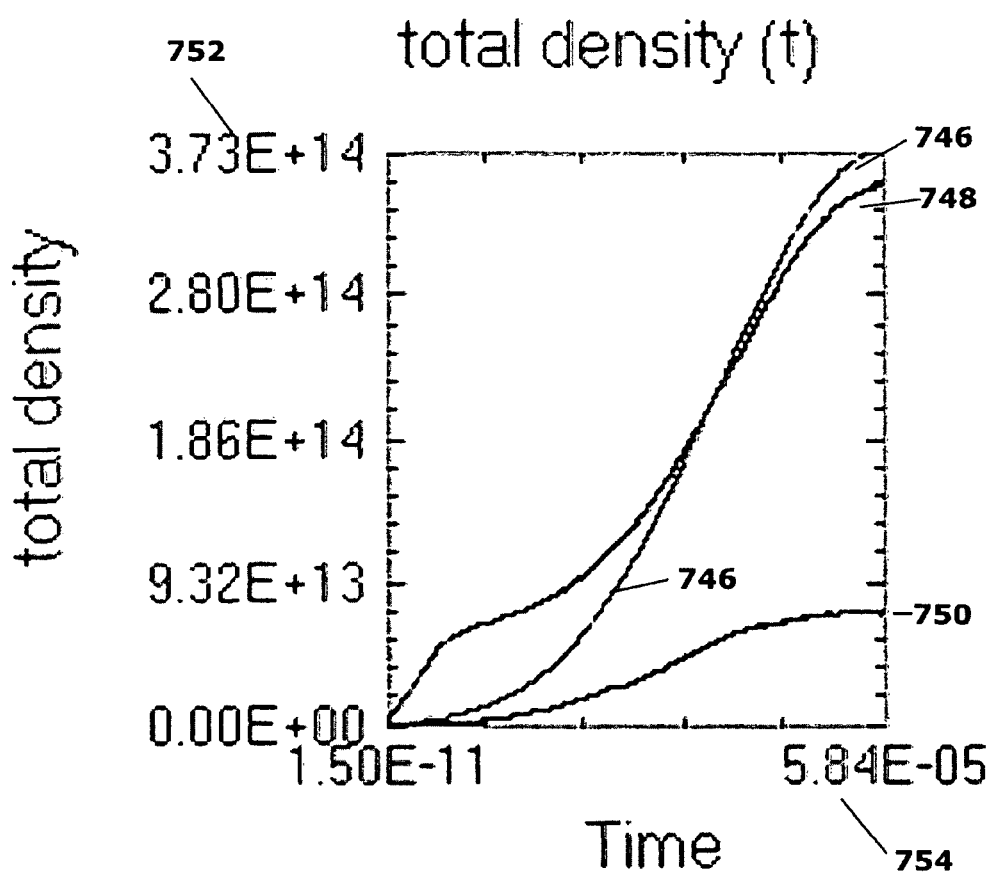

FIG. 7F shows another snapshot from the same simulation, also made at 58-microseconds. Three curves in FIG. 7F show ion density 746, beam-electron density 748, and MCC-electron density 750. Each MCC electron was born from ionization of a neutral gas atom, as opposed to electrons which emit from electron guns 414. After birth, MCC-electrons and electrons interact identically with each other and with ions. OOPIC Pro tracks MCC-electrons separately from electrons. This allows the parameters defined in block 899 to be optimized to balance the three densities shown in FIG. 7F. The parameters of block 899 were adjusted by trial and error to produce densities rising continuously with time. The ion density 746 reaches a maximum 3.73E14 on density scale 752. This density is about 4% of the density needed to produce maximum fusion energy in this embodiment.

The simulation producing the diagnostic plots shown in FIGS. 7E-7F took 45 hours of computing time on a 2.5 GHz Pentium-4 computer. The MCC box 898 was therefore deemed too slow to use in simulating steady-state operation. A faster-to-compute, but less-accurate simulation technique, was used in OOPIC Pro.

This simulation of the gas nozzles 418 by neutral gas ionization (MCC) could reach steady state if run on a faster computer. The densities in FIG. 7F will continue rising indefinitely as long as the computer continues to run the simulation. On the computer used, full fusion density would have been reached after about 1000 hours of computing time.

Beta=Unity Steady State Operation

Figure 9:
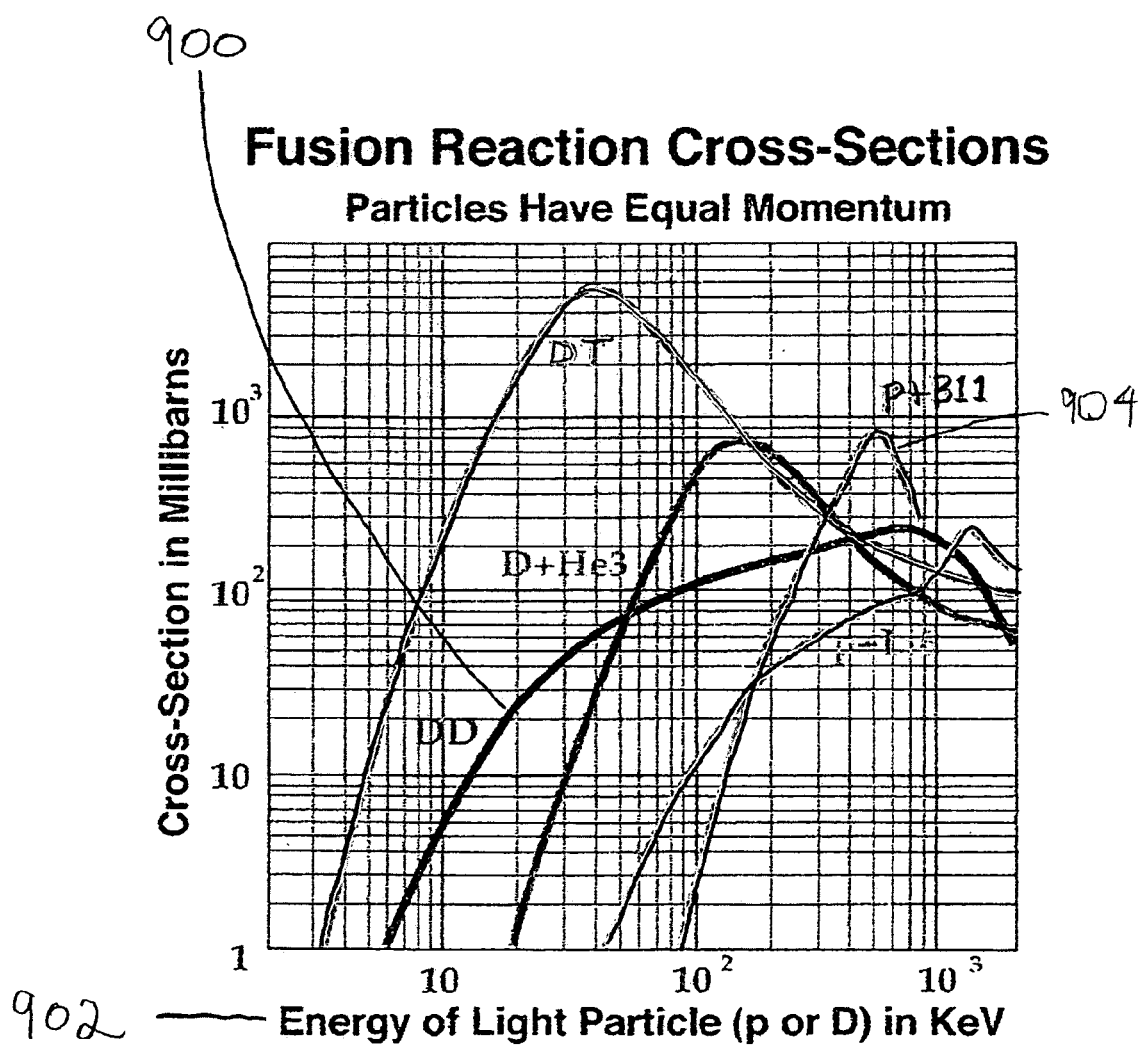
FIG. 9 is a graph of energy production rates for various possible fusor fuel choices.

Repeated computer simulations were used to tune the operating parameters of this embodiment. The goal of the tuning was to arrive at a set of operating parameters which produced maximum fusion power. The type of fuel was chosen first. The deciding factors in making this choice are shown in FIG. 9. For any chosen fuel, the power output of a fusor is proportional to the fuel's characteristic reaction rate, which is in turn proportional to the graphed cross-section function.

The abscissa of FIG. 9 refers to the energy of one of the ions when they meet each other at the center of the fusor. The graphs show that the higher this energy the higher is the reaction cross-section. Curve "DD" 900 plots the value of the "Fusion Reaction Cross-Section" as a function of Light Particle "Energy" 902 for the selected fuel. The ion energy chosen for the simulation was fifteen kilo-electron-volts (KeV). Higher ion energy would produce more neutrons, but would also cost more to implement.

Curve 900 shows that the cross-section for D+D fuel rises exponentially with rising "Energy" 902. On the same abscissa is curve "p+B11" 904. "p+B11" 904 shows the cross-section for a different choice of fuel, one comprised of a mixture of hydrogen(p) and boron-11 (B11). p+B11 has advantages over D+D when used in other embodiments of the module. It is a promising choice for larger-scale fusion power devices because it is environmentally friendly and produces no radioactive by-products.

Other curves in FIG. 9, not referenced, present still other possible choices of fuels. "DT" stands for deuterium plus tritium (D+T). Tritium is a radioactive, toxic, expensive isotope of hydrogen. Despite tritium's drawbacks, D+T might still be an attractive fuel choice for future embodiments because this reaction's cross section is bigger than the others at low "Energy". FIG. 9 shows that at "Energy"=fifteen KeV, the D+T cross section is seventy times bigger than the D+D cross section.

D+D fuel was chosen for this first embodiment because deuterium gas is relatively inexpensive, nontoxic, and easy to handle.

Simulation shows that the D ions at the center of the fusor have energies equal to the electron energy 830. FIG. 7C shows that the depth of the potential well 730 that confines the D ions is also approximately equal to the electron energy 830, namely fifteen KeV.

The physics mechanism that causes the central ion energy to equal the electrons' injected energy differs between the two alternate ways to inject ions into the fusor. Ions produced by ion guns 430 are born at the edge of the potential well 730. From this position they accelerate uniformly to electron energy 830 by falling into the center of the well 730.

Ions produced by gas ionization (MCC) are born throughout the gas volume, which fills the whole space inside the magnet boxes 410. Initially, ions born of gas ionization have many different energies depending on the distances from center of their birthplaces. Ions born with energy less than the electron energy 830 soon up-scatter to reach that same energy 830. Up-scattering is a process that occurs when a low-energy ion hits a high-energy electron. In the collision, the ion gains energy from the electron. Many such collisions happen to each ion until the ions finally attain the same energy as the maximum electron energy 830.

OOPIC-Pro simulation shows that the final ion energy distribution is the same regardless of which method is used to simulate the gas nozzle 418. Once the operation of the embodiment reaches steady state, the energy of the ions at the center of potential well 730 is approximately equal to the electron energy 830.

The simulation value of B-field field strength 890 was chosen, for economic reasons, to be one of the values available in commercially available magnets. A range of values from 0.06 T to 0.188 T (0.6 to 1.8 kiloGauss) is available in typical magnets, as shown in FIG. 4C. B-field strength 890 in the simulation was taken as 1.0 kiloGauss as a compromise for economy, and because WB-6 used approximately the same value.

Once electron energy 830 and field strength 890 are chosen, the plasma density needed for steady-state operation was determined according to Bussard 2006—IAC. Efficient use of the electron drive power and magnet power requires plasma energy density equal to magnetic field energy density at the surface of the plasma cloud. Lowercase Greek letter "Beta" is the plasma physics symbol for the ratio of the aforementioned energy densities. Beta is defined on pg. 29 of "2002 REVISED NRL PLASMA FORMULARY" (available from website http://wwwppd.nrl.navy.mil/nrlformulary/NRL_FORMULARY_02.pdf).

Equality of energy densities requires that the steady-state operating point be at Beta=unity. A value of unity for Beta is the maximum physically allowed by well-known principles of plasma confinement. For ion energy fifteen KeV and magnetic field one kiloGauss, Beta=unity translates to ion density 1E19 ions per cubic-meter.

The Simulation of Steady State Operation

To reach steady state operation the simulated ion density must be raised to 1E19/cubic-m, as discussed above. The previously described techniques for simulating the gas nozzle 418 took too much computer time to complete the startup of the fusor to this high a density. An alternate method of simulating steady state used the "Load" feature of the OOPIC-Pro software package. "Load" is an element of the input file which specifies an arbitrarily dense plasma to be present in the fusor at the beginning of the simulation.

Figure 7G:
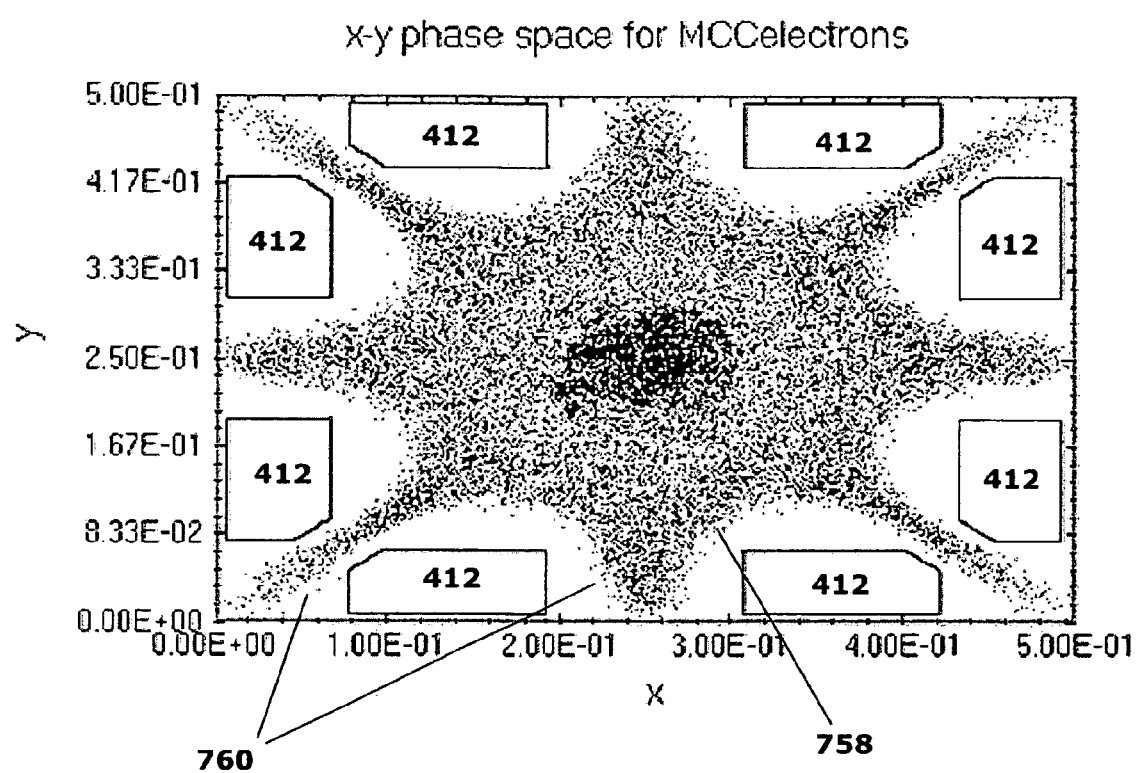

FIG. 7G shows a diagnostic plot from simulation at the Beta=unity, steady-state operating point. As expected, steady-state electrons 758 are confined inside the eight magnets 412, except for along the steady-state cusps 760. Steady-state electrons 758 are distributed over a wider area than startup electron cloud 727 in FIG. 7B. The high-density cloud of electrons 758 is larger and more circular than the cloud 727 at lower (startup) density. This change in the electron cloud is described in 2006—IAC as the WiffleBall effect. It is caused by diamagnetic cancellation of the static B-field from the magnets 412. The onset of the WiffleBall effect closes the cusp holes at high density. Closed cusp holes leak less electrons and thereby reduce the input power needed to replace the lost electrons. This allows the steady-state fusor to run more efficiently and to approach closer to the break-even operating point than it does during startup.

FIG. 8H shows a portion of OOPIC-Pro code 800 used to produce the electrons 758 diagnostic plot. A block of "Load" code 89A specifies the density and energy of ions and electrons, as well as the dimension of square region they occupy inside the magnets 412. The loaded plasma is specified to be slightly electron-rich as it would have been if these plasma conditions were reached gradually by extending the startup simulation for longer computing times. The velocities of the electrons and ions loaded in code 89A are made isotropic by specifying ⅙ of the total density loaded to be traveling in each of positive and negative directions along the x, y, and z axes directions.

Advantages of this Embodiment over Prior Art

FIGS. 2-5 will be used to explain the advantages of this embodiment. The reference numbers below refer to the figure with the same first digit, for example module 200 would refer to FIG. 2, etc.

One advantage is ease of maintenance. Each module 200 is independent of the other five modules. If some part of a module 200 malfunctions, it is only necessary to turn off the power, remove the bolts holding the flange 205 to the tank 207, and replace the module 200 with a spare or repaired module 200. In steady-state operation, the plasma will heat the interior of the fusor to a high temperature. This can cause materials to warp and melt. Ease of maintenance is therefore an important advantage to minimize down time.

Another advantage is reduced plasma-electron loss rate. The hollow legs 404 are entirely outside the imaginary cube formed by the magnets 412 at the center of the fusor. This mounting arrangement leaves a corner spacing 450 along the twelve edges of the imaginary cube formed by the magnets 412. The confined electrons naturally flow in and out through the gaps between the chamfered edges 409 of the magnets 412. These twelve gaps are carefully adjusted and kept free of obstruction to allow the electrons to flow optimally. By insuring that the flowing electrons do not hit anything in the gaps, the electrons have a long confinement time and a low energy when they are finally lost. This reduces the power consumed by the fusor and takes it closer to break-even operation.

Another advantage over the prior art is the ability to economically optimize performance of a prototype fusor. The spacer flange 400 is inexpensive and easily modified. Its thickness controls the crucial corner spacing 450 between modules. Optimizing this spacing 450 minimizes the power consumption by reducing ion and electron losses in the gaps between modules.

First ever steady-state operation of a Bussard fusor is another advantage. By providing cooling to the magnets 412, direct-current power 510, and operator control via computer 504, long term operation of a practical fusion energy device is possible for the first time.

An additional advantage of this embodiment is the incorporation of magnets 412 of substantially rectangular cross section (that is except for the minor chamfer 409). Rectangular cross section magnets are available commercially from several suppliers one of which is shown in FIG. 4C. Commercial competition makes the magnets inexpensive and robust. Because the magnets necessarily run hot, robustness is needed to extend reliable operating time from millisecond to months. To make chamfer 409 only requires modifying the factory's coil winding program to omit a few turns at the outside edge of the coil. This is a minor change which will not increase the cost of production of the magnets.

Yet another advantage of this embodiment is its use of a less expensive vacuum tank 207. The dimensions of the circular openings to accommodate flanges 205 are smaller than the (square) size of the assembled fusor. Smaller circular openings require a thinner wall thickness for the same tank strength. Saving money on expensive materials such as stainless steel or aluminum permits testing many prototype fusors for the same price as one fusor of the prior art. Setup, testing, and modifications can proceed in parallel on separate prototype devices.

Other Embodiments of this Invention

FIG. 3a shows holes 300, 304, 310, and 312 carrying services to the interior parts of module 200. The first flange-leg-hole 300 carries trip wire 528 and services to gas nozzle 418; second flange-leg-hole 304 carries cooling lines 505 to and from magnet 412; third flange-leg-hole 310 carries current to power magnet 412; and fourth flange-leg-hole 312 carries return current from magnet 412. The assigned uses of the holes 300, 304, 310, and 312 will vary in other embodiments. Nor is the number of holes necessarily four. In general, any number of holes may penetrate flange 205 and join to a same number of hollow legs 404, whatever number is sufficient for the need to service and physically support magnet 412. A single hollow leg will be sufficient for some embodiments. The main limitation for the number and placement of holes is that the legs 404 attached to the holes not interfere with electron circulation. In the first embodiment, detailed above, the circulating electrons flow in and out along eight cusp lines 760, spaced at 45 degree intervals from each other around the flange 205. The holes 300, 304, 310, and 312 are spaced apart one from the next by arc length 302 equal to 22.5 degrees. This choice places the legs 404 as far as possible from the cusp lines 760.

The electron gun 414 is not the only useful form of electron source. A hot-filament source could be used to produce electrons at the same position where the electron gun 414 is shown in FIG. 4. The power connectors to such a hot-filament source would penetrate the vacuum through center hole 314 similarly to the connections of electron-gun 414. A fusor constructed with some modules having electron guns 414 and some other modules having hot-filament sources would also have advantages.

Figure 6:
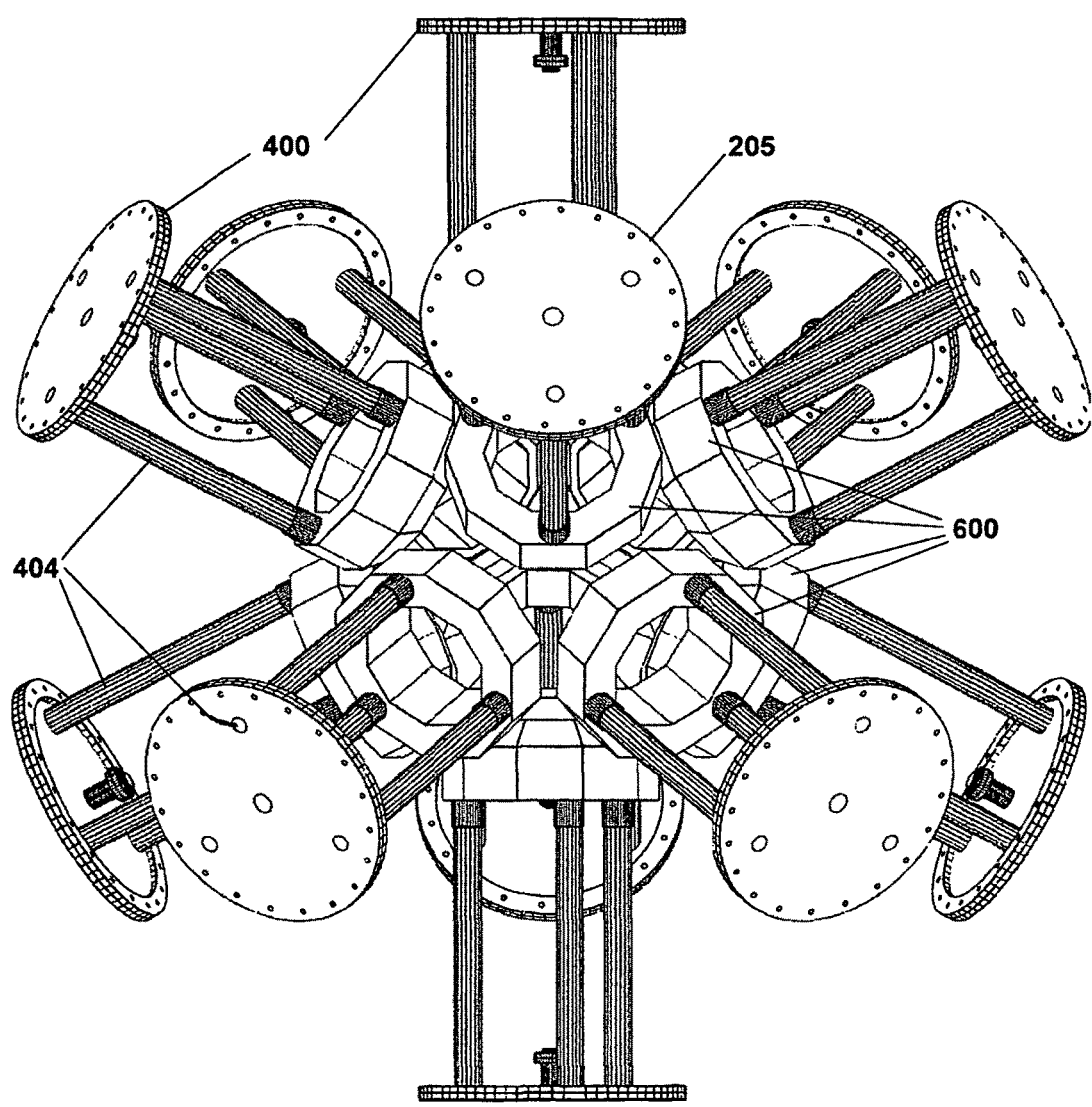
FIG. 6 is an assembly drawing of an alternate embodiment into a dodecahedron shaped fusor.

FIG. 6 shows an embodiment with additional advantages over the prior art. Ten-sided magnet boxes 600 are arranged on the faces of an imaginary dodecahedron. The boxes 600 are each supported on three hollow legs 404. Each leg 404 is vacuum welded to the box 600 at one end and vacuum welded to a module flange 205 at its other end. The flange 205 is bolted to a spacer flange 400 and to a butt flange, not shown.

The dodecahedron has advantages over the cube, used in the first embodiment. A dodecahedron better approximates a sphere than a cube does. A more circular cross section for the confined plasma will improve the convergence of ions at the center of the resulting potential well. A more nearly spherical potential well will also reduce cusp losses of ions.

Figure 3B:
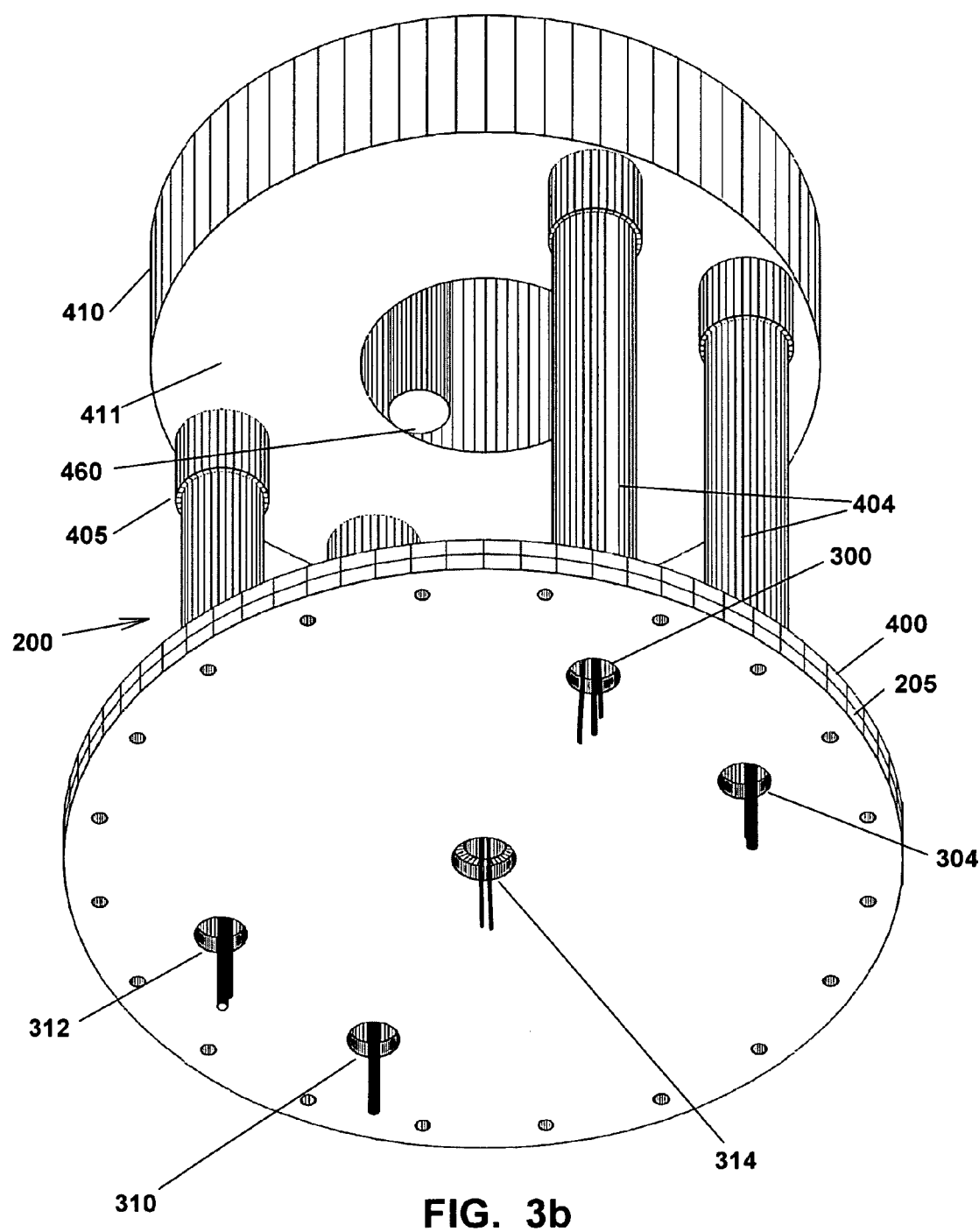
Figure 3C:
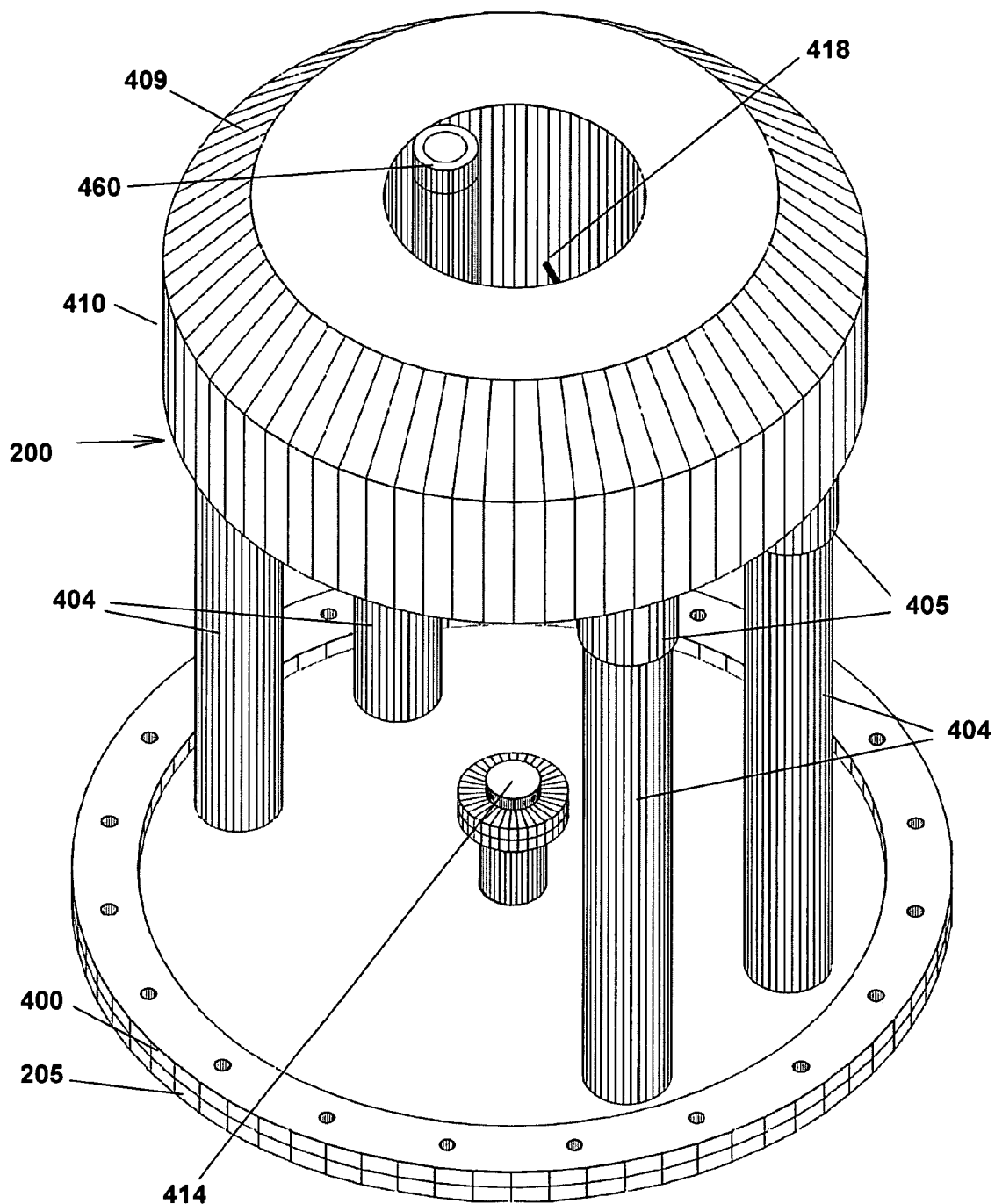

FIG. 3b shows an alternate embodiment with possible advantages over the first embodiment module 200. An internal ion source 460 is mounted in the clear space on the inner surface of magnet box 410. One possible choice for ion source 460 is commercially available ion gun 430 of FIG. 4G. FIG. 3c shows another view of the same alternate embodiment with internal ion source 460. An advantage of including both internal ion source 460 and gas nozzle 418 in a single module is to provide separate control of ion injection during startup (gas nozzle 418) and steady state (source 460).

Conclusions, Ramifications, and Scope

Accordingly, the reader will see that the hardware module provides economical construction and improved performance of fusion energy generating devices. Developing such devices will lead to construction of power generating plants to provide for the future energy needs of the planet.

Specific improvements in performance include, but are not limited to, convenient maintenance, power balance approaching break-even, stable long-term operation, use of commercially available components, and economy of materials.

The quest for break-even power output from an inertial-confinement type fusion device will lead to testing bigger and bigger prototypes. The prototypes will also tend to be built more spherical as they are made larger. The module described is especially well-suited to expanding the size of prototypes. The larger the dimension of the polyhedron on which the fusor is based, the greater the advantage of implementing it with the module of this patent.

Although the description above contains many specifications, these should not be considered as limiting the scope of the embodiments, but as merely providing illustrations of some of the presently preferred embodiments. For example, the modules can take other shapes, with noncircular flanges, legs of different lengths, and legs of different diameters. The modules covering a polyhedron need not contain all-identical magnets. For instance, the soccer ball is a polyhedron composed of alternating hexagonal and pentagonal faces. It could be effectively covered by alternating modules containing hexagonal and pentagonal shaped magnets.

Future fusors will be fueled by more exotic reactions than D+D. For example, a fusor burning p+B11 would contain alternating modules feeding two different gases, one containing hydrogen and one containing boron.

Thus, the scope of the embodiment should be determined by the appended claims and their legal equivalents, rather than by the examples given.

The invention claimed is:
1. A steady-state fusion energy device comprising:
 (a) a vacuum tank having a plurality of outer tank faces, an inner tank volume, and a center of said inner tank volume;

(b) a polyhedron having a plurality of faces and a center of said polyhedron, each of said plurality of faces being enclosed by a plurality of edges, each of said plurality of edges being disposed between one of said plurality of faces and an adjacent one of said plurality of faces, and said polyhedron disposed so as to place said center of said polyhedron approximately at said center of said inner tank volume;

(c) a plurality of modules, each of said plurality of modules comprising
  (1) a vacuum flange having an inside face and an outside face, said vacuum flange being penetrated by a plurality of flange-leg-holes, each of said plurality of flange-leg-holes connecting said outside face to said inside face;
  (2) a plurality of hollow, pressure-tight legs each having an end and an opposite-end spaced from said end by a predetermined length, said end of each of said plurality of hollow, pressure-tight legs aligned one-on-one with each of said plurality of flange-leg-holes, and said end vacuum-sealed to said inside face; and
  (3) an annular shaped pressure vessel having an outer vessel face and an inner vessel volume, said outer vessel face spaced said predetermined length from said inside face, said outer vessel face being penetrated by a plurality of vessel-leg-holes connecting said outer vessel face to said inner vessel volume, each of said plurality of vessel-leg-holes aligned one-on-one with said opposite-end of said plurality of hollow, pressure-tight legs, and each of said plurality of vessel-leg-holes being vacuum-sealed one-on-one to said opposite end;

(d) said modules disposed so as to place each of said annular shaped pressure vessels one-on-one onto each of said plurality of faces of said polyhedron, each of said annular shaped pressure vessels being disposed to create a plurality of gaps, each of said plurality of gaps being of predetermined width, each of said plurality of gaps defining an open space from each of said annular shaped pressure vessels to a next adjacent one of said annular shaped pressure vessels across each of said plurality of edges of each of said plurality of faces of said polyhedron; and (e) a plurality of annular shaped electromagnets each comprised of a plurality of associated power-connections and a plurality of associated coolant connectors, each of said plurality of annular shaped electromagnets contained inside said inner vessel volume of one of said plurality of modules, each of said plurality of power-connectors passing through a hollow interior of one of said plurality of hollow pressure-tight legs, and each of said coolant-connectors passing through a hollow interior of one of said plurality of hollow pressure-tight legs, whereby a plasma in an energy device can be confined in vacuum by a surrounding polyhedron of electromagnets, not touching each other and conveniently connected to services and operating in atmospheric air.

2. The fusion energy device of claim 1 wherein each of said plurality of hollow, pressure-tight legs is comprised of a hollow, pressure-tight, voltage-isolating section positioned between said end and said opposite-end, the electrical resistance of said voltage-isolating section being sufficient to support a predetermined voltage difference, generally more than one kilovolt, between said end and said opposite end, whereby
  each hollow, pressure-tight leg also supports a high voltage difference between the vacuum flange and the pressure vessel.

3. The fusion energy device of claim 2 further including:
(a) a central hole penetrating said vacuum flange and connecting said outside face to said inside face at the approximate center of said vacuum flange; and
(b) an electron emitter selected from the group consisting of electron-gun and hot filament source, said electron emitter including a plurality of power connections passing through said central hole from said inside face to said outside face, said electron emitter vacuum-sealed to said inside face and positioned to emit electrons in a direction generally perpendicular to said inside face, whereby the module includes an electron emitter connected through the module's vacuum flange and positioned to emit electrons in the direction away from the inside face of the flange, said electrons being accelerated by said voltage difference.

4. The fusion energy device of claim 3 further including:
(a) a gas delivery tube passing from said outside face through one of said plurality of hollow, pressure-tight legs, and into said inner vessel volume;
(b) a gas delivery hole connecting said inner vessel volume to said outer vessel face, said gas delivery hole vacuum-sealed to said gas delivery tube; and
(c) a gas nozzle vacuum-sealed to said gas delivery hole at said outer vessel face, and a flow of gas connected to said gas delivery tube at said outside face, said flow of gas containing fusion fuel atoms selected from the group consisting of hydrogen, deuterium, tritium, helium-3, lithium and boron, whereby
the fusion energy device includes a means of delivering a flow of fusion fuel atoms through one of the hollow, pressure-tight legs and further through the inner vessel volume.

5. The fusion energy device of claim 4 further including a remotely controlled valve for adjusting said flow of gas, said valve being connected in-line with said gas delivery tube, whereby a computer controls the flow of fuel atoms into the gas delivery tube via a valve.

6. The fusion energy device of claim 3 further including:
(a) a plurality of ion sources mounted on said outer vessel face, the type of said ion sources being predetermined as appropriate to supply ions of atoms selected from the group consisting of hydrogen, deuterium, tritium, helium-3, lithium, and boron, and
(b) a plurality of service connections from said ion sources, said plurality of service connections passing through vacuum-sealed holes from said outer vessel face into said inner vessel volume, each of said plurality of service connections continuing from said inner vessel volume, through one of the plurality of hollow, pressure-tight legs, to said outside face of said vacuum flange, whereby
ion sources supply fuel ions at the outside surface of said annular shaped pressure vessels and the services to the ion sources connect to them through one or more of the hollow, pressure-tight legs.

\* \* \* \* \*